United States Patent

Ozers et al.

[11] Patent Number: 6,003,454
[45] Date of Patent: Dec. 21, 1999

[54] AUTOMATIC COAXIAL ENGAGEMENT DRIVE COUPLER

[75] Inventors: Guntis Ozers, Woodridge; Joseph A. Michalic, Downers Grove, both of Ill.

[73] Assignee: Case Corporation, Racine, Wis.

[21] Appl. No.: 09/060,664

[22] Filed: Apr. 15, 1998

[51] Int. Cl.$^6$ .................................................. A01C 19/02
[52] U.S. Cl. ........................... 111/184; 111/200; 111/921
[58] Field of Search .................................. 111/170, 171, 111/172, 177, 178, 183, 184, 200, 921, 922; 192/23

[56] References Cited

U.S. PATENT DOCUMENTS

| | | |
|---|---|---|
| 268,807 | 12/1882 | Landis . |
| 1,506,400 | 8/1924 | Wynne . |
| 2,097,062 | 10/1937 | Harris . |
| 2,148,975 | 2/1939 | Agren . |
| 2,439,479 | 4/1948 | Mackmann . |
| 2,444,148 | 6/1948 | Warwick . |
| 2,619,211 | 11/1952 | Belden . |
| 2,870,615 | 1/1959 | Walk . |
| 3,053,362 | 9/1962 | Doble et al. . |
| 3,362,143 | 1/1968 | Gullickson . |
| 3,633,384 | 1/1972 | Jarren . |
| 3,831,685 | 8/1974 | Birkenbach . |
| 3,884,050 | 5/1975 | Borcuk . |
| 3,982,670 | 9/1976 | Brass . |
| 4,137,853 | 2/1979 | Peterson ..................................... 111/67 |
| 4,251,014 | 2/1981 | Salley et al. ........................... 111/69 X |
| 4,359,952 | 11/1982 | Gesior et al. ............................. 111/80 |
| 4,547,177 | 10/1985 | Ueno ......................................... 464/69 |
| 4,601,372 | 7/1986 | Swales et al. ......................... 192/67 R |
| 4,690,260 | 9/1987 | Landphair ................................. 192/71 |

(List continued on next page.)

OTHER PUBLICATIONS

Nodet Gougis Planter II Semoirs Monograines Polyvalents; 10 pages; undated.
WIC Precision Vacuum Planter Operator's Manual and Parts Bood; 55 pages; 1994.
Stanhay Singulaire 785—The Precision Vacuum Seeder From Stanhay; 4 pages; undated.
Accord Precision Seed Drill Optima Operating Instructions—from serial No. 158; Art . No.: 758642/08.92; 55 pages.
MT 600; 34 pages; undated.
Monosena Pneumatic Planter Operator's Manual; NG Plus Mounted Planter; 60 pages; undated; presented by A.T.I., Inc. of Merriam Kansas.
IS249 Kinze® Brush–type Seed Meter Installation, Operation and Maintenance; 4 pages; Revised Aug. 1992.
Kinze® 2000 Series Planters; 24 pages; Rev. Aug. 1993.
White 6200/6300 Series Planters; Ultimate Flexibility; 4 pages; 1995 ABCO Corporation, Duluth, Georgia.
White 6000 Series Planters; Managing for Profit; 24 pages; Form No. LT93PL035 1993.
Dickey–john High Rate Seed Sensors; 1 page; undated.
Planter Attachments for MaxEmerge®Plus, MaxEmerge2®, and Max Emerge®Planters; 24 pages; DKA139; undated.
Advantage 1780 New Planter . . . New Sales Advantages; 8 pages; DKB506; undated.
MaxEmerge®Plus Planters; 40 pages; undated.

*Primary Examiner*—Christopher J. Novosad
*Attorney, Agent, or Firm*—Foley & Lardner

[57] ABSTRACT

A first torque coupler adapted for use with a second torque coupler having first and second lugs spaced apart by a first distance includes a support, a first member rotatably coupled to the support and including a third lug, and a second member rotatably coupled to the support and including a fourth lug. The first and second members engage one another to prevent unrestricted rotation of the first and second members in the same direction. The first and second members are rotatable in opposite directions when in engagement with at least one of the first and second lugs to move at least one of the third and fourth lugs, a first torque transmitting position in which the third and fourth lugs are spaced from one another by a second distance substantially equal to the first distance to a second position in which the third and fourth lugs are spaced from one another by a third distance unequal to the first distance.

27 Claims, 10 Drawing Sheets

U.S. PATENT DOCUMENTS

| | | | |
|---|---|---|---|
| 4,843,983 | 7/1989 | Olson | 111/174 |
| 4,928,858 | 5/1990 | Tite | 111/34 X |
| 5,072,676 | 12/1991 | Pingry et al. | 111/200 X |
| 5,170,909 | 12/1992 | Lundie et al. | 221/211 |
| 5,325,800 | 7/1994 | Wisor et al. | 111/185 |
| 5,392,722 | 2/1995 | Snipes et al. | 111/174 |
| 5,613,321 | 3/1997 | Rizkovsky | 49/139 |
| 5,632,885 | 5/1997 | Yamasaki et al. | 210/96.1 |
| 5,655,468 | 8/1997 | Ledermann et al. | 111/164 |

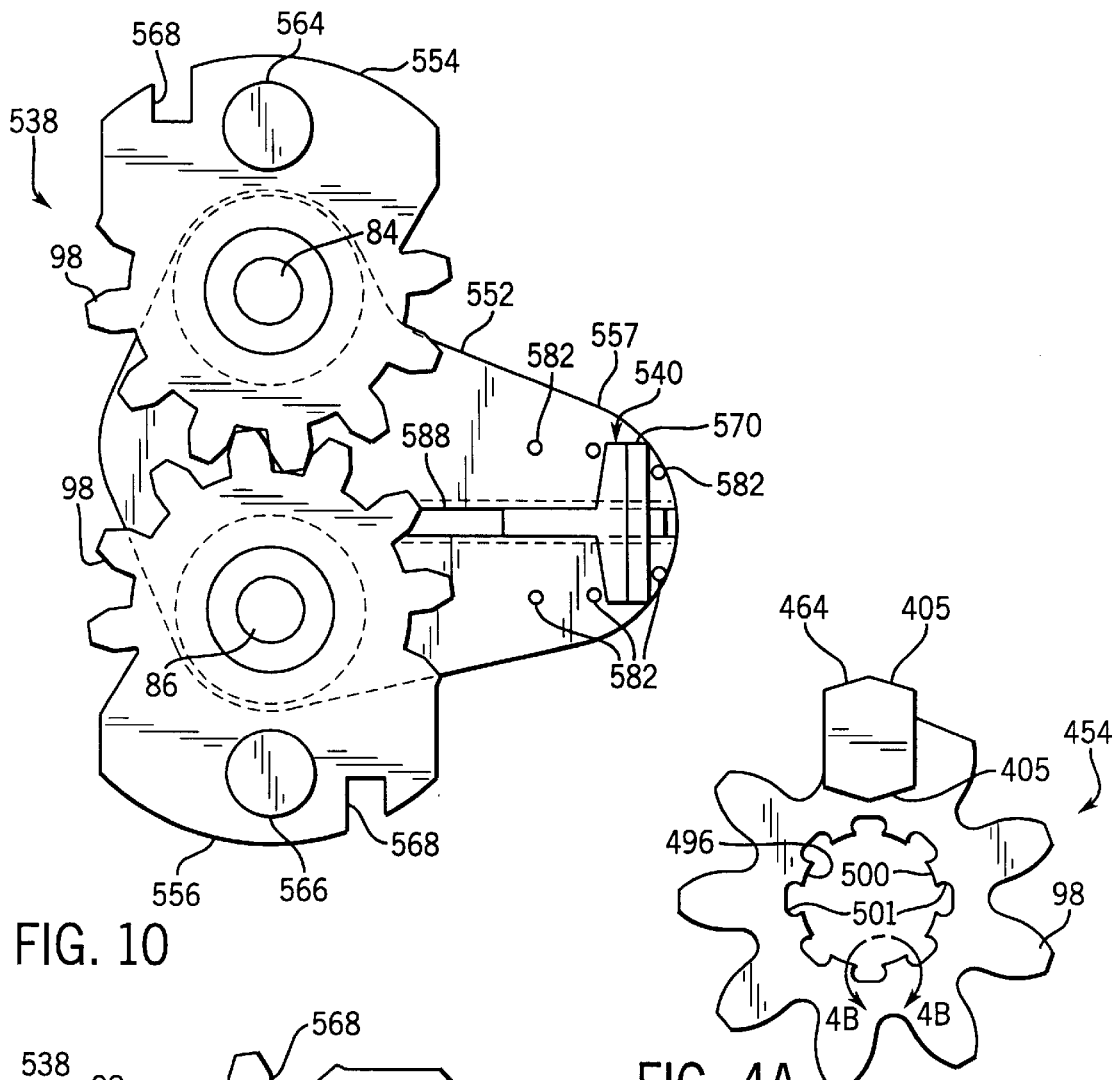
FIG. 10
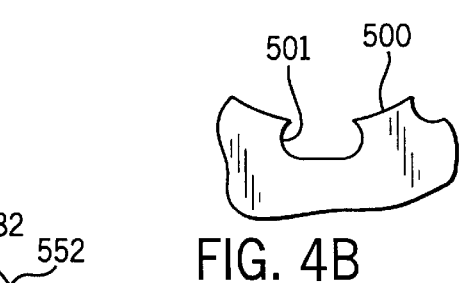
FIG. 4A
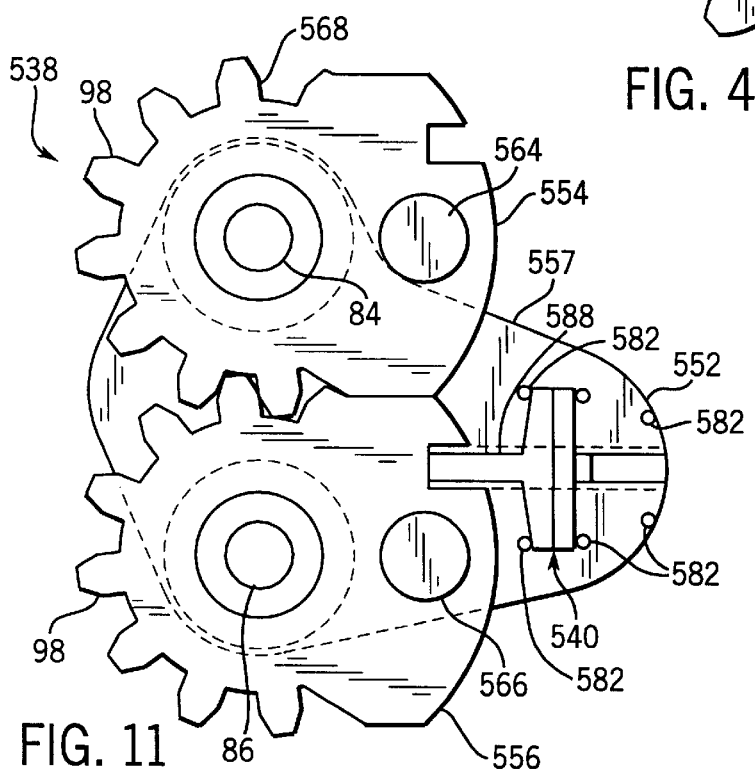
FIG. 11
FIG. 4B 6,003,454

AUTOMATIC COAXIAL ENGAGEMENT DRIVE COUPLER

FIELD OF THE INVENTION

The present invention relates to rotatable drive arrangements. In particular, the present invention relates to a rotatable drive arrangement having a torque coupler which enables the driven portion of the arrangement to be engaged or disengaged from the drive portion of the arrangement.

BACKGROUND OF THE INVENTION

Disengageable drive coupling systems are utilized in a variety of different machines. Disengageable drive coupling systems are typically utilized in machines where the driven portion of the coupling system must be periodically separated and removed from the drive train or drive portion of the system for various reasons.

One example of a machine incorporating a disengageable coupling system is a conventionally known plate planter. Plate planters typically include a frame supporting a multitude of planting units across the width of the planter for implanting seeds into the ground. Each planting unit includes a furrow opening mechanism and a furrow closing mechanism. Each planting unit further includes a hopper and an associated seed meter. The seed meter includes a seed disc or plate, which upon being rotated, meters seeds to the furrow unit in a conventionally known manner. The seed plate is driven by a driven shaft which is operably coupled to a drive shaft and a drive train of the planter.

During planting, the seed meter often fills with dirt, chaff and other foreign matter. As a result, it is often necessary to periodically remove the meter for cleaning. It is also frequently necessary to remove the meter in order to change the seed plate. To remove the meter from the planter requires that the driven shaft be separated and removed from the drive shaft and the planter drive train.

Because conventional plate planters include a seed meter and hopper for each individual row unit and row, the hoppers and seed meters are often closely spaced to one another across the width of the planter. As a result, it is extremely difficult to axially separate the driven shaft and the drive shaft so as to disengage the driven shaft and associated seed meter from the drive shaft. It is also extremely difficult to axially couple the driven shaft and the drive shaft to one another for the transmission of torque. Thus, there has been a continuing need for a disengageable coupling system that enables the driven shaft to be disengaged and separated from the drive shaft by simply vertically lifting the driven shaft relative to the drive shaft. Conversely, there has also been a continuing need for a disengageable coupling system that enables the driven shaft to be engaged to the drive shaft by simply vertically lowering the driven shaft adjacent to the drive shaft.

SUMMARY OF THE INVENTION

The present invention is directed to a first torque coupler adapted for use with a second torque coupler having first and second lugs spaced apart by a first distance, wherein the first torque coupler includes a support, a first member rotatably coupled to the support and including a third lug, and a second member rotatably coupled to the support and including a fourth lug. The first and second members engage one another to prevent unrestricted rotation of the first and second members in the same direction. The first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

According to one aspect of the present invention, the first member comprises a first gear having gear teeth and the second member comprises a second gear having gear teeth engaging the gear teeth of the first member. According to an alternative aspect of the present invention, the first member includes a first cam surface and the second member includes a second cam surface configured to engage the first cam surface. The first and second cam surfaces are preferably enclosed within a housing.

According to yet another aspect of the present invention, the first torque coupler includes a first resilient element between the support and the first member. In addition, the first torque coupler additionally includes a second resilient element between the support and the second member.

The present invention is also directed to the first torque coupler adapted for use with a second torque coupler having first and second lugs spaced apart by a first distance, wherein the first torque coupler includes a support, a first member rotatably coupled to the support and including a third lug, a second member rotatably coupled to the support and including a fourth lug and member engagement means coupled to the first and second members to inhibit unrestricted rotation of the first and second members in the same direction. The first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

The present invention is also directed to a disengageable drive system including a first torque coupler having first and second lugs and a second torque coupler rotatable about an axis of rotation. The second torque coupler includes a support, a first member rotatably coupled to the support and including a third lug adapted to engage the first lug, a second member having a fourth lug adapted to engage the second lug and being rotatably coupled to the support in engagement with the first member so as to prevent rotation of the first and second members in the same rotational direction, and a resilient element coupled between the support and the first member, the resilient element biasing the third lug into a torque transmitting position in which the third lug is positioned for engagement with the first lug.

The present invention is also directed to a planter including a frame, a rotatable drive shaft coupled to the frame, a seed meter releasably coupled to the frame and including a rotatable seed metering surface, a driven shaft coupled to the seed metering surface, a first torque coupler coupled to one of the drive shaft and the driven shaft and including first and second lugs spaced apart by a first distance and a second torque coupler coupled to the other of the drive shaft and the driven shaft. The second torque coupler includes a support, a first member rotatably coupled to the support and including a third lug, and a second member rotatably coupled to the support and including a fourth lug, when the first and second members engage one another to prevent unrestricted rotation of the first and second members in the same direction, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

BRIEF DESCRIPTION OF THE DRAWINGS

FIG. 4A is a top elevational view of alternate embodiment of a member of the driven coupler of FIG. 3.

FIG. 4B is an enlarged fragmentary elevational view of a member of FIG. 4A taken along lines 4B—4B.

FIG. 10 is a top elevational view of a third embodiment of the driven coupler of having members in torque transmitting position.

FIG. 11 is a top elevational view of the driven coupler of FIG. 10 illustrating the members locked in a non-torque transmitting position.

DETAILED DESCRIPTION OF THE PREFERRED EMBODIMENTS

Figure 1:
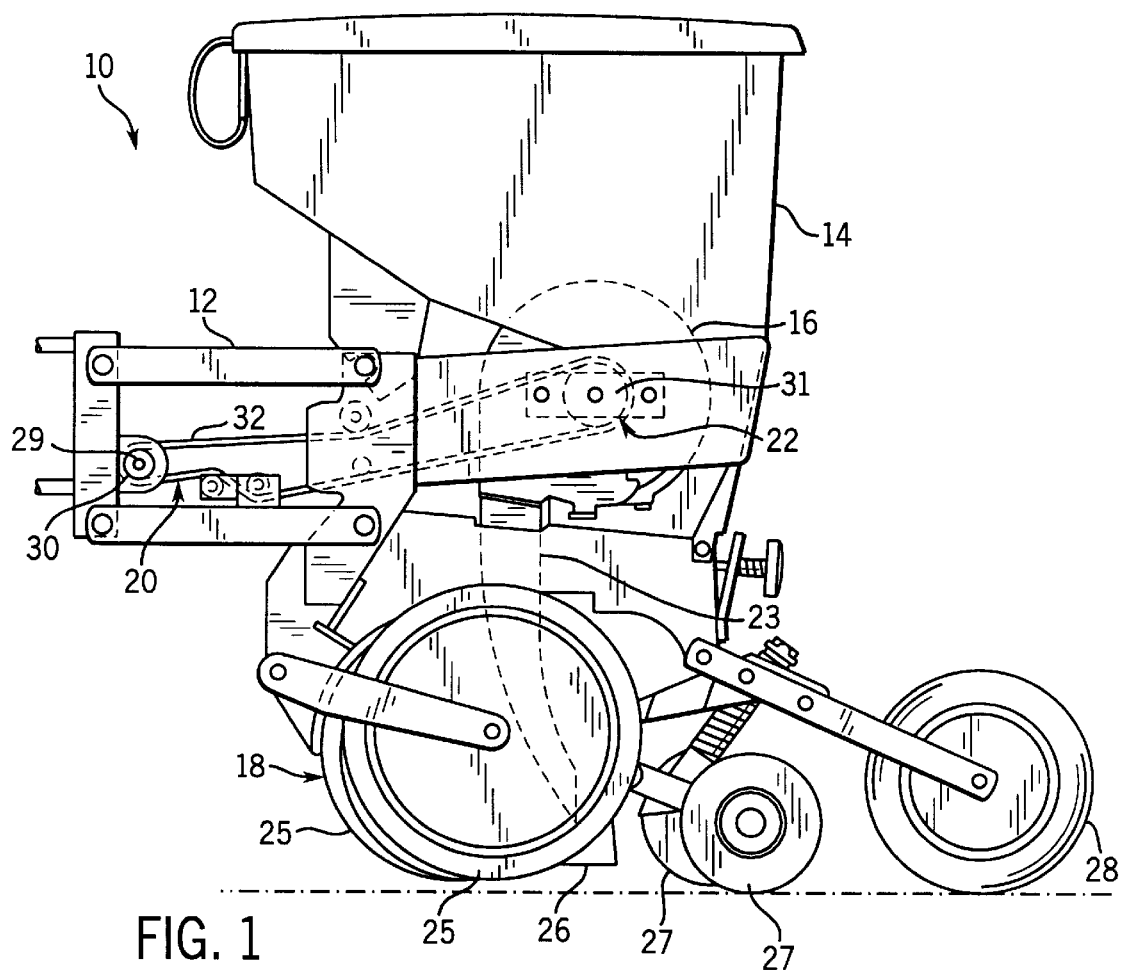
FIG. 1 is a side elevational view of a planter including the drive coupling system of the present invention.

FIG. 1 is a side elevational view of a planter 10 including frame 12, hopper 14, seed meter 16, furrow opening and closing mechanism 18, drive train 20, and drive coupling system 22. Frame 12 generally comprises a support structure configured for supporting hopper 14, seed meter 16, furrow opening and closing mechanism 18, drive train 20 and drive coupling system 22. As can be appreciated, frame 12 may have a variety of different sizes, shapes and configurations depending upon the type of vehicle pulling planter 10 as well as the size, configuration and number of hoppers 14, seed meter 16 and coupling systems 22.

Hopper 14 is supported by frame 12 and provides a container for storing and dispensing seed to seed meter 16. Seed meter 16 is conventionally known and is attached to hopper 14 substantially below hopper 14. Upon being rotatably driven by drive train 20, seed meter 16 meters and dispenses seeds through chute 23 to the furrow created by mechanism 18 in a conventionally known manner.

Furrow opening and closing mechanism 18 is conventionally known and is mounted to the underside of frame 12. Furrow opening and closing mechanism 18 generally includes a pair of laterally spaced furrow opening discs 25, an opener chute 26, a pair of laterally spaced furrow closer discs 27 and a press wheel 28. Furrow opener disc 25 and opener chute 26 create a furrow in the soil in a conventionally known manner. Once seeds have been deposited at a controlled rate by seed meter 16 into the furrow via chute 23, seed closer disc 27 closes the furrow together and over the seed. Press wheel 28 compacts the soil closed over the seeds. As will be appreciated, planter 10 may alternatively include other types of mechanisms for implanting the seeds into the ground, such as a runner-type opener for creating a furrow in the ground.

Drive train 20 is conventionally known and generally includes drive shaft 29, sprocket 30, sprocket 31 and chain 32. Drive shaft 29 preferably comprises an elongate bar rotatably supported by frame 12 across the width of planter 10. Drive shaft 29 is itself rotatably driven in a conventionally known manner so as to drive sprocket 31. Sprocket 31 is coupled to sprocket 31 via chain 32. Sprocket 31 is rotatably mounted to frame 12 adjacent seed meter 16. Sprocket 31 is coupled to seed meter 16 by disengageable drive coupling system 22. As can be appreciated, drive train 20 may have various other well-known configurations for rotatably driving seed meter 16 via disengageable drive coupling system 22. For example, drive train 20 may alternatively comprise a conventionally known sheave and belt arrangement or may comprise a conventionally known gear train.

Disengageable drive coupling system 22 extends between sprocket 31 and seed meter 16. As shown and described in detail hereafter, disengageable drive coupling system 22 automatically disengages without the need for manual assistance to permit removal of seed meter 16 and hopper 14 from frame 12. Disengageable drive coupling system 22 also automatically reengages to couple sprocket 31 to seed meter 16 when seed meter 16 and hopper 14 are reinstalled on frame 12. Moreover, disengageable drive coupling system 22 enables seed meter 16 and hopper 14 to be separated from frame 12 or to be reinstalled on frame 12 by simple vertical movement of seed meter 16 and hopper 14 relative to frame 12.

Figure 2:
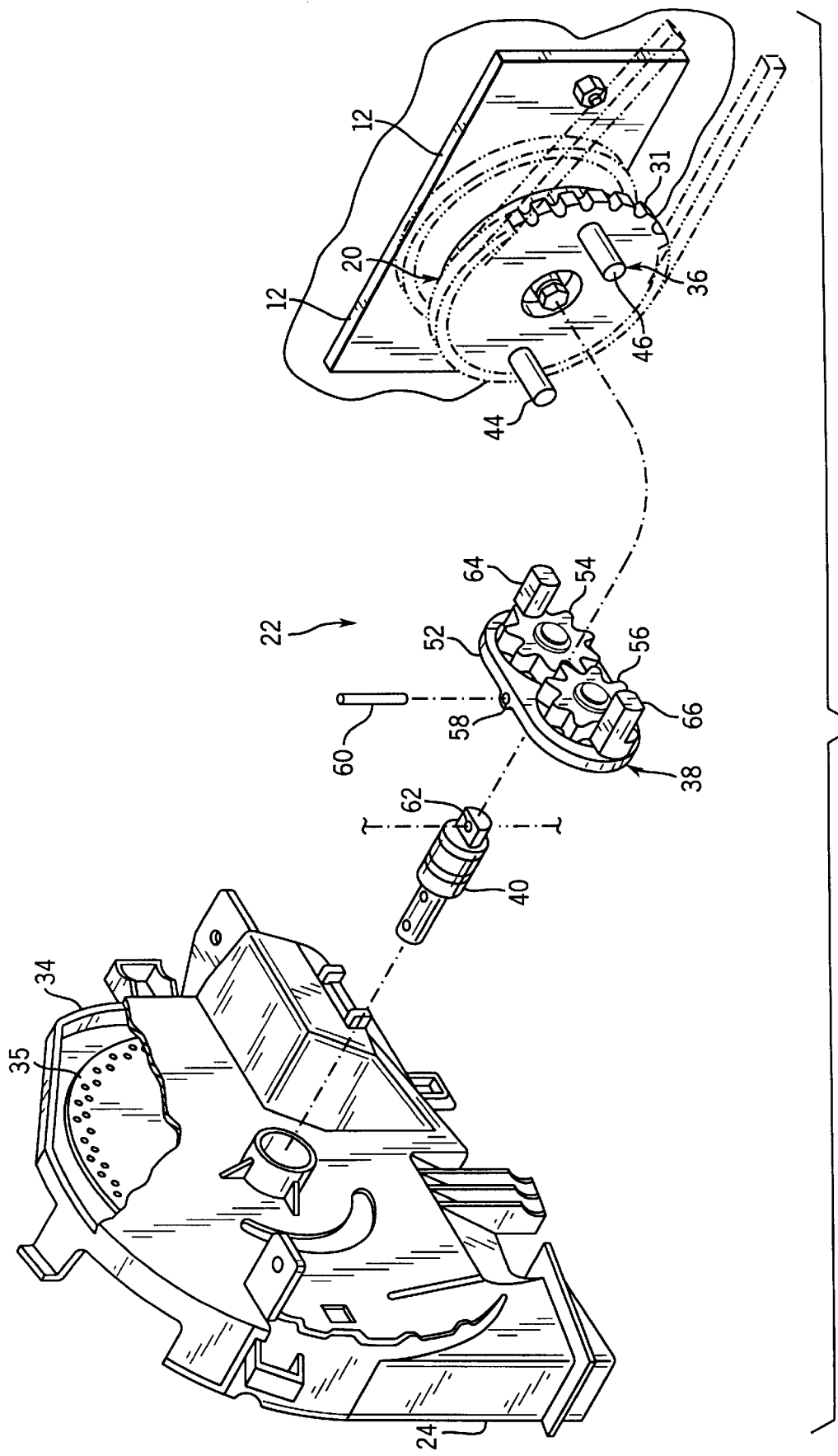
FIG. 2 is an exploded fragmentary perspective view of the planter of FIG. 1 illustrating the drive coupling system.

FIG. 2 is an exploded fragmentary perspective view of planter 10 illustrating disengageable drive coupling system 22 in greater detail. As best shown by FIG. 2, seed meter 16 includes a housing 34 adapted to be mounted to frame 12 and a seed disc or plate 35 rotatably supported within housing 34. Seed plate 35 carries and meters seeds within housing 34 to chute 24 (shown in FIG. 1). Seed plate 35 is rotatably driven by drive train 20 via drive coupling system 22.

Drive coupling system 22 generally includes drive coupler 36, driven coupler 38 and driven shaft 40. Drive coupler 36 comprises two spaced lugs 44, 46 (also known as protuberances or pawls) operably coupled to sprockets 30 of drive train 20 and adapted to engage driven coupler 38. In the exemplary embodiment illustrated, lugs 44 and 46 obliquely, and preferably perpendicularly, extend directly from a face of sprocket 31 and are spaced apart from one another on opposite sides of axis 48 by approximately 180 degrees. Alternatively, lugs 44, 46 may obliquely extend from a separate supporting member rotatably coupled to drive train 20 via a drive shaft such that lugs 44, 46 are rotatably driven about axis 48 by drive train 20. Moreover, depending upon the configuration of driven coupler 38, lugs 44, 46 may alternatively be spaced from one another by different distances or degrees about axis 48. In addition, depending upon the configuration of driven coupler 38, lugs 44, 46 may be supported by a separate supporting member for rotation about axis 48 wherein lugs 44, 46 radially project outward from axis 48 or inward towards axis 48.

Driven coupler 38 releasibly engages drive coupler 36 and transmits torque from drive coupler 36 to driven shaft 40. Driven coupler 38 generally includes support 52 and members 54, 56. Support 52 rotatably supports members 54 and 56 and is configured for being non-rotatably coupled to driven shaft 40. In the exemplary embodiment illustrated, support 52 is configured for being keyed with driven shaft 40. Support 52 further includes a pair of spaced and aligned bores 58 sized for receiving an elongate pin 60 which extends through bores 58 and through a corresponding bore 62 within driven shaft 40 to further secure driven shaft 40 to support 52. Alternatively, support 52 may be non-rotatably coupled to drive shaft 40 by various other attachment means or may be integrally formed as part of a single unitary body with driven shaft 40.

Members 54 and 56 are rotatably coupled to support 52 so as to engage one another when members 54 and 56 are rotated in the same rotational direction (i.e., both members 54 and 56 rotate clockwise or both members 54 and 56 rotate counterclockwise) so as to prevent further rotation of members 54 and 56 in the same direction. Member 54 includes lug 64, also known as a protuberance or pawl, while member 56 includes lug 66. Lugs 64 and 66 extend from members 54 and 56, respectively, so as to overlap and engage lugs 44 and 46 when members 54 and 56 are in engagement with one another while being driven in the same rotational direction. In the exemplary embodiment illustrated, lugs 64 and 66 obliquely, and preferably perpendicularly, extend from faces of members 54 and 56, respectively, towards a torque transmitting position (as shown by FIG. 2) in which lugs 64 and 66 are positioned for engaging lugs 44 and 46. In the exemplary embodiment illustrated, in the torque transmitting position, lugs 64 and 66 are supported 180 degrees relative to one another about axis 48. As a result, when lugs 44 and 46 are in engagement with lugs 64 and 66 and when couplers 36 and 38 are moved relative to one another, lugs 64 and 66 as well as members 54 and 56 rotate in opposite directions to move lugs 64 and 66 closer together such that the linear distance separating lugs 64 and 66 is less than the linear distance separating lugs 44 and 46. As a result, at least one of lugs 64 and 66 may be moved through opening 70 between lugs 44 and 46. This enables couplers 36 and 38 to automatically engage one another and automatically disengage one another upon movement of couplers 36 and 38 relative to one another in a direction oblique to axis 48. Consequently, upon being vertically lowered relative to coupler 36, lugs 64 and 66 engage lugs 44 and 46 and are thereby repositioned with respect to lugs 44 and 46 to engage lugs 44 and 46 on opposite sides of axis 48 for transmitting torque from drive train 20 to driven shaft 40. Conversely, upon being lifted relative to coupler 36, lugs 64 and 66 automatically reposition themselves with respect to lugs 44 and 46 so as to automatically disengage lugs 44 and 46 to enable coupler 38 and any associated component, such as seed meter 16 and hopper 14 (shown in FIG. 1), to be separated from coupler 36 and its associated components including drive train 20 and frame 12.

Driven shaft 40 is an elongate shaft having one end non-rotatably coupled to support 52 concentrically about axis 48 and having a second end coupled to seed plate 35. Driven shaft 40 transmits torque from support 52 to seed plate 35. In operation, drive train 20 transmits torque to coupler 36 which transmits torque to coupler 38. Coupler 38, in turn, transmits torque across driven shaft 40 to seed plate 35.

Figure 3:
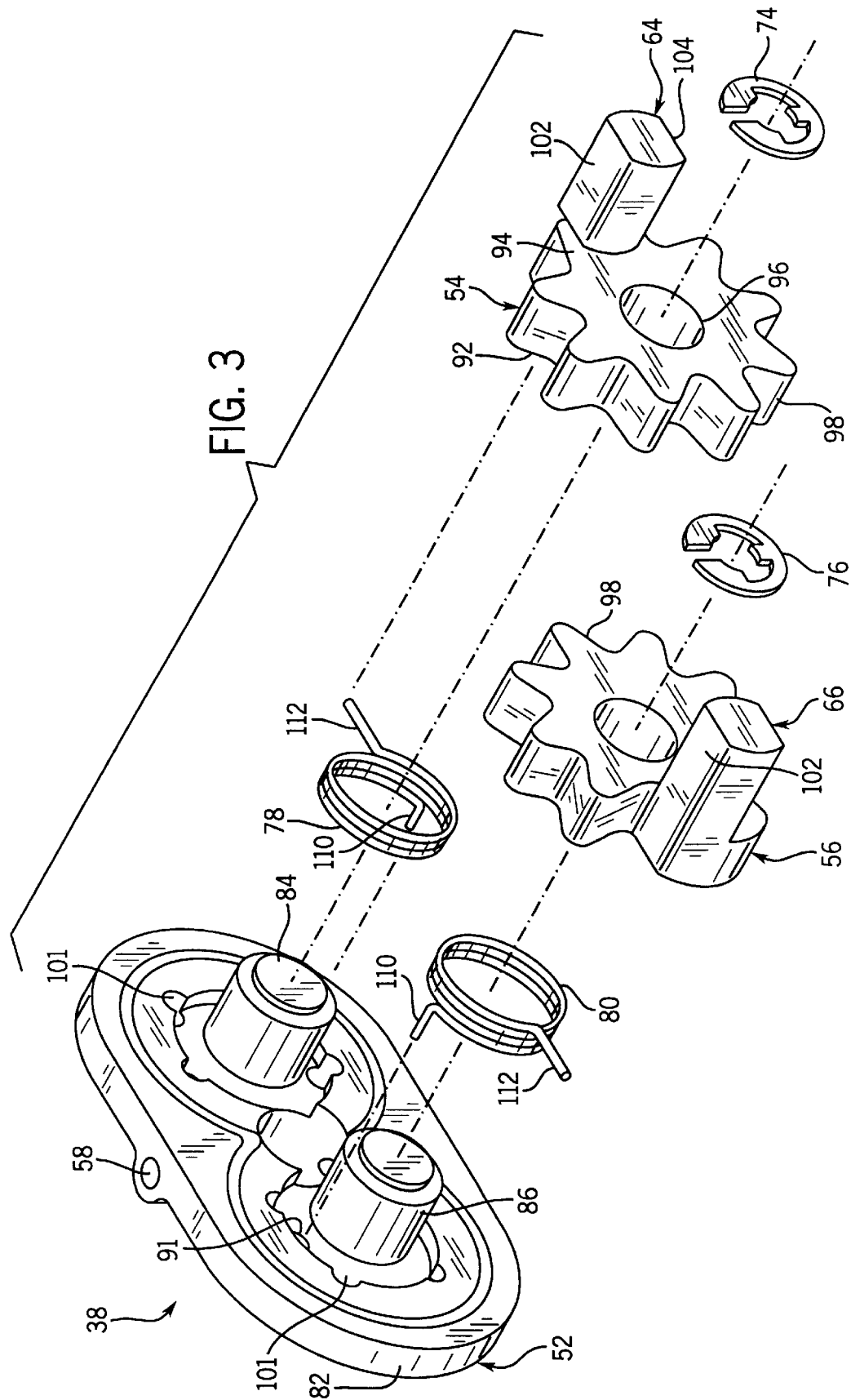
FIG. 3 is an exploded perspective view of a driven coupler of the drive coupling system of FIG. 2.
Figure 4:
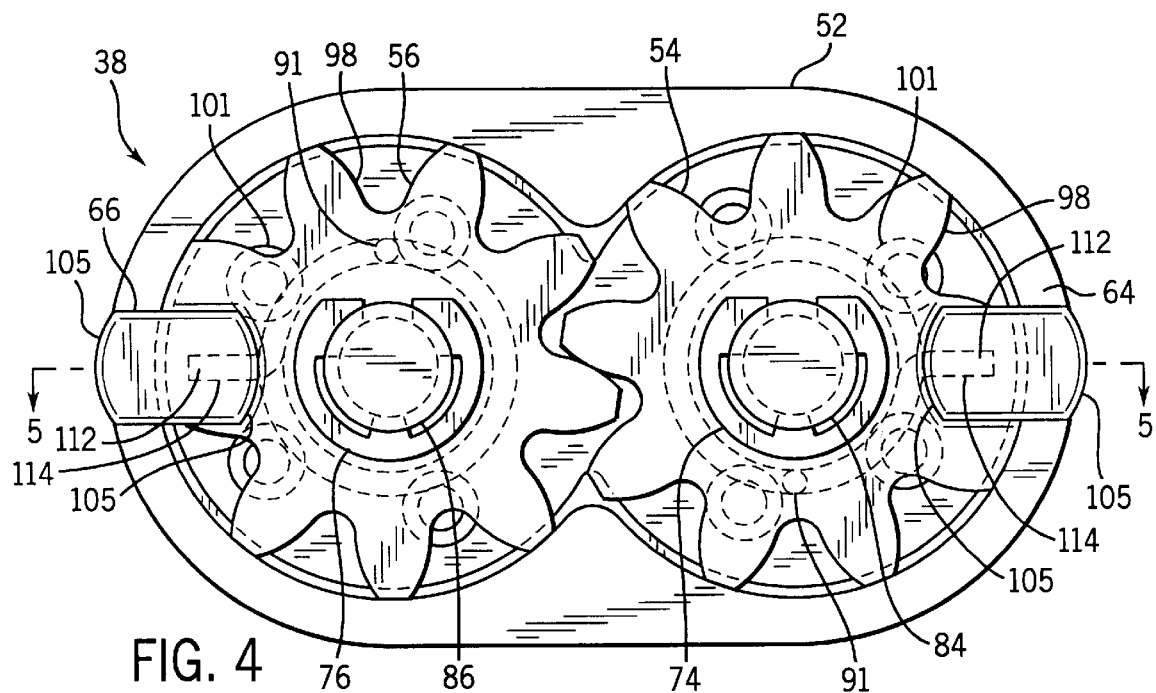
FIG. 4 is a front elevational view of the driven coupler of FIG. 3.
Figure 5:
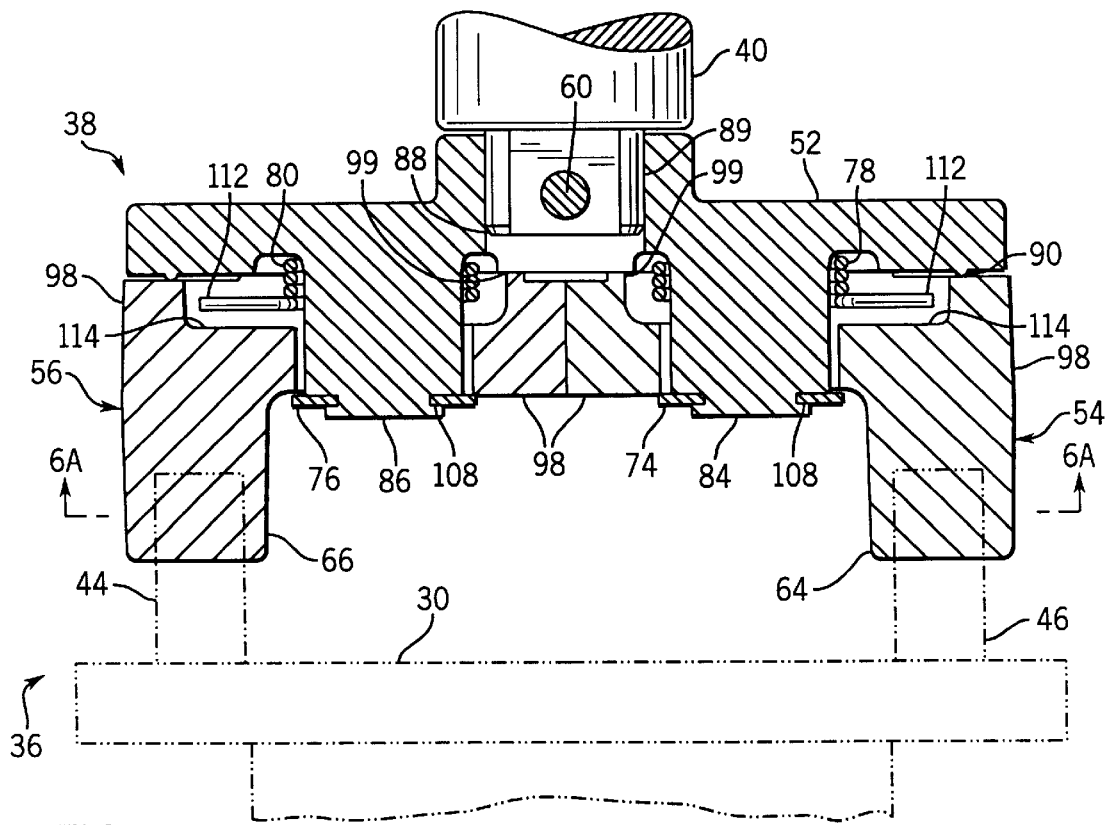
FIG. 5 is a sectional view of the driven coupler of FIG. 4 taken along lines 5—5 with the coupler being connected to a driven shaft and being positioned adjacent a drive coupler.

FIGS. 3–5 illustrate torque coupler 38 in greater detail. FIG. 3 is an exploded perspective view illustrating coupler 38. FIG. 4 is a front elevational view of torque coupler 38. FIG. 5 is a sectional view of torque coupler 38 taken along lines 5—5 of FIG. 4 with coupler 38 connected to driven shaft 40 and in engagement with coupler 36. As shown by FIG. 3, coupler 38 more specifically includes support 52, members 54, 56, retainers 74, 76 and resilient elements 78, 80. Support 52 includes base 82 and hubs or spindles 84, 86. Base 82 is configured for being non-rotatably coupled to driven shaft 40.

As best shown by FIG. 5, base 82 includes a bore 88 configured for receiving an axially projecting lug 89 of driven shaft 40. Bore 88 and lug 89 are preferably noncircular such that base 82 is keyed to driven shaft 40. Alternatively, base 82 may be configured for being pinned or otherwise nonrotatably secured to driven shaft 40 by various other well-known connection methods. As further shown by FIG. 5, lug 89 of driven shaft 40 includes bore 62 configured for being aligned with bores 58 of base 82. Bore 62 as well as bores 58 receive pin 60 to axially fix base 82 of support 52 to driven shaft 40.

In addition, base 82 supports spindles 84 and 86 and provides a structure to which resilient elements 78 and 80 are affixed. In particular, base 82 includes a detents 91 for each of resilient elements 78 and 80. As best shown by FIG. 4, detents 91 comprise bores extending into base 82 which are sized for receiving end portions 110 of resilient elements 78 and 80. Detents 91 are located such that resilient elements 78 and 80 engage members 54 and 56 to bias members 54 and 56 to the torque transmitting position shown in FIG. 4. Alternatively, resilient elements 78 and 80 may be nonrotatably fixed to support 52 by various other well-known fasteners or connection methods.

Spindles 84 and 86 comprise elongate, cylindrical members projecting from a face of base 82 at spaced locations. Spindles 84 and 86 are configured for extending through members 54 and 56, respectively, and for serving as axles for rotatably supporting members 54 and 56, respectively. Although illustrated as being formed as part of a single unitary body with base 82, spindles 84, 86 may alternatively be fixedly attached or rotatably mounted to base 82. Spindles 84 and 86 support members 54 and 56 at locations such that members 54 and 56 engage one another upon being rotated in the same rotational directions.

In the exemplary embodiment illustrated in FIG. 5, base 82 additionally includes an annular protuberance 90 projecting from base 82 towards members 54 and 56. Protuberance 90 bears against members 54 and 56 to maintain members 54 and 56 axially centered upon spindles 84 and 86. As a result, protuberance 90 prevents members 54 and 56 from binding with base 82 of support 52.

As further shown by FIGS. 3–5, base 82 also additionally includes a plurality of bores 101 extending therethrough. Bores 101 are preferable conical in shape. Bores 101 facilitate the discharge of dirt and debris from between members 54 and 56 and base 82. As a result, bores 101 also prevent binding of members 54 and 56 and base 82 which is caused by the accumulation of dirt and debris therebetween.

In the exemplary embodiment illustrated, members 54 and 56 are substantially identical to one another. Each of members 54 and 56 generally comprises a spur gear having a first face 92 facing base 82, a second opposite face 94, a concentric bore 96, detents 97, a plurality of radial teeth 98 and either of the aforementioned lugs 64, 66. As best shown by FIG. 5, each face 92 of members 54 and 56 include an annular projecting bearing surface 99 extending about bore 96. Bearing surface 99 bears against face 92 to support members 54, 56 against base 82. Bearing surface 99 reduces the surface areas of base 82 and members 54 and 56 in contact with one another to reduce frictional drag.

Bores 96 extend through members 54 and 56 and are sized for receiving spindles 84 and 86 for rotation about the axes of spindles 84 and 86, respectively. Bores 96 comprise cylindrical bores. As can be appreciated, members 54 and 56 may alternatively be attached to or integrally formed to include spindles which axially project from face 92 and which rotate within corresponding bores formed in base 82 of support 52.

Detents 97 extend into faces 92 of members 54 and 56. Detents 97 are sized for receiving end portions 112 of resilient elements 78 and 80. Detents 97 secure resilient elements 78 and 80 to members 54 and 56, respectively, for the transmission or torque therebetween. Detents 97 are preferably located such that resilient elements 78 and 80 resiliently bias members 54 and 56, as well as lugs 64 and 66, to the torque transmitting position illustrated in FIG. 4.

Radial teeth 98 encircle each of members 54 and 56 and are configured so as to constantly engage corresponding radial teeth 98 of the other member 54, 56 when rotating about the axes of spindles 84 and 86. Because teeth 98 of member 54 are constantly in engagement with teeth 98 of member 56, teeth 98 of members 54 and 56 abut and oppose rotation of members 54 and 56 in the same rotational direction regardless of whether both members 54 and 56 are transmitting torque in either a clockwise direction or a counterclockwise direction.

Lugs 64 and 66 obliquely project from face 94 of each of member 54 and 56. Each of lugs 64 and 66 includes two opposing surfaces 102, 104 and side surfaces 105. Surfaces 102, 104 generally extend parallel to one another and which are located eccentric to respect to the axis of rotation of members 54 and 56. Lugs 64 and 66 project from face 94 a distance sufficient such that either of surfaces 102 or 104 engages and abuts either of lugs 44 or 46 of coupler 36 (shown in FIG. 2). Lugs 64 and 66 are preferably located so as to align with lugs 44 and 46 when members 54 and 56 are rotated such that lugs 64 and 66 are positioned 180 degrees apart from one another about axis 48 (shown in FIG. 5).

Side surfaces 105 extend between opposing surfaces 102 and 104. Side surfaces 105 are preferably configured so as to inwardly taper from an intermediate apex towards surfaces 102 and 104. In the embodiment illustrated, side surfaces 105 are generally convex. Alternatively, side surfaces 105 may have various other configurations, such as triangular. Because side surfaces 105 inwardly taper from an intermediate apex towards surfaces 102 and 104, lugs 64 and 66 more easily move between lugs 44 and 46 when rotated towards one another.

FIGS. 4A and 4B illustrate member 454, an alternative embodiment of member 54. Member 454 is substantially identical to member 54 except that member 454 includes bore 496 in lieu of bores 96 and lug 464 in lieu of lug 64. For ease of illustration, those remaining elements of member 464 which are identical to members 64 are numbered similarly. As illustrated by FIGS. 4A and 4B, bore 496 includes circumferential teeth 500 which extend along an outer circumferential surface of bores 96. Teeth 500 provide surfaces 501 which engage adjacent the surfaces of spindles 84 and 86 to scrape and otherwise remove accumulate dirt and other contaminants. Lug 464 is similar to lug 64 except that lug 464 includes side surfaces 405.

Side surfaces 405 extend between opposing surfaces 102 and 104 and inwardly taper from an intermediate apex towards surfaces 102 and 104. Side surfaces 405 inwardly taper from an intermediate apex towards surfaces 102 and 104 to enable lug 464 to more easily move between lugs 44 and 46 when rotated towards one another. As will be appreciated, member 56 may also be alternatively configured similar to that of lug 464.

Retainers 74 and 76 engage spindles 84 and 86 and members 54 and 56 to axially retain members 54 and 56 about spindles 84 and 86. Retainers 74 and 76 preferably comprise conventionally known snap rings having an outer diameter greater than the diameter of bores 96 and having an inner diameter configured to snap about a groove 108 in either of spindles 84 and 86. Alternatively, other structures or mechanisms may be used to axially retain members 54 and 56 about spindles 84 and 86 or relative to base 82.

Resilient elements 78 and 80 are resiliently flexible or resiliently deformable members which are coupled between support 52 and members 54 and 56, respectively. Resilient elements 78 and 80 resiliently bias members 54 and 56, respectively, such that lugs 64 and 66 are biased into the torque transmitting position illustrated in FIG. 4 whereby lugs 64 and 66 are linearly spaced from one another by a distance substantially equal to the linear distance separating lugs 44 and 46 of coupler 36 (shown in FIG. 2). With respect to the linear distance separating lugs 64 and 66 as well as the linear distance separating lugs 44 and 46, the term "substantially equal" means that the linear distance separating lugs 64 and 66 is sufficiently similar to the linear distance separating lugs 44 and 46 such that at least a portion of either of surfaces 102 or 104 abut against and engage at least a portion of either of lugs 44 and 46 by a sufficient amount to transmit torque. In the exemplary embodiment illustrated, resilient elements 78 and 80 comprise conventionally known torsion springs having a first end portion 110 configured for projecting into a corresponding detents 91 of base 82 and a second end portion 112 configured for being received within a corresponding cavity or detents 97 extending within either member 54 or member 56 (shown in FIGS. 4 and 5). Detents 91 and 97 as well as portions 110 and 112 are configured so as to bias lugs 64 and 66 into the torque transmitting position.

Although resilient elements 78 and 80 are illustrated as torsional springs, a multitude of alternative elements and structures may be used to resiliently bias members 54 and 56 as well as lugs 64 and 66 into the torque transmitting position. For example, coupler 38 may alternatively include rubber bushings positioned about spindles 84 and 86 within bores 96, wherein the bushings resiliently twist and deform in response to forces rotating members 54 and 56 out of the torque transmitting position. Other elements such as single compression springs may also be used. In the exemplary embodiment illustrated, because teeth 98 of members 54 and 56 are in constant engagement with one another during rotation of either of members 54 and 56, one of resilient elements 78 and 80 may be omitted since the rotation of either of members 54 or 56 by its resilient element will automatically cause the other member 54 or 56 to correspondingly rotate to the torque transmitting position. As will be appreciated, various other biasing arrangements employing other forms of resilient elements may be used to resiliently bias members 54 and 56 as well as lugs 64 and 66 into the torque transmitting position. In lieu of resilient elements 78 and 80 coupled between support 52 and members 54 and 56, respectively, resilient elements 78 and 80 may be replaced with a single resilient element or multiple resilient elements interconnecting members 54 and 56, themselves, to one another such that members 54 and 56 are resiliently biased to the torque transmitting position. Such an alternative embodiment may includes a single, elastic band affixed to each of members 54 and 56, wherein rotation of either members 54 and 56 out of the torque transmitting position stretches the band.

Figure 6A:
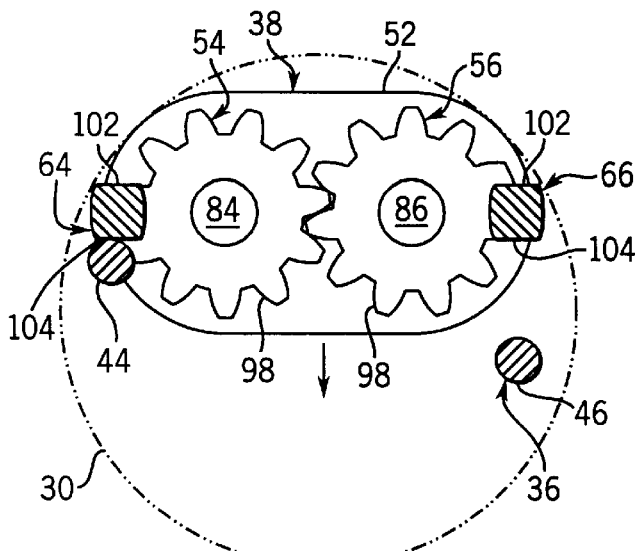
FIG. 6A is a sectional view of the driven coupler and the drive coupler of FIG. 5 taken along lines 6A—6A prior to lugs of the drive coupler engaging lugs of the driven coupler.

FIGS. 6A–6F illustrate coupler 38 being moved relative to coupler 36 whereby lugs 64 and 66 automatically reposition themselves upon engaging at least one of lugs 44 and 46 such that couplers 36 and 38 are automatically coupled to one another for the transmission of torque. In particular, FIG. 6A–6F illustrate coupler 38 being lowered relative to coupler 36 such as when seed meter 16 and hopper 14 are lowered into position adjacent to drive train 20 (shown in FIG. 1) after being cleaned or inspected. FIG. 6A is a sectional view of coupler 36 and coupler 38 taken along lines 6A—6A of FIG. 5. As shown by FIG. 6A, upon coupler 38 being decoupled from coupler 36 and drive train 20, resilient members 78 and 80 (shown in FIGS. 3–5) apply a biasing force to members 54 and 56, respectively, to cause members 54 and 56 to rotate to the torque transmitting position at which lugs 64 and 66 are linearly spaced apart from one another by a linear distance substantially equal to the linear distance separating lugs 44 and 46 of coupler 36. The term linear distance generally means the length of a line having ends located at the center points of the lugs. In the example illustrated, lugs 64 and 66 are positioned opposite one another about the axis of driven shaft 40 (shown in FIGS. 2 and 5). In the exemplary positioning example illustrated in FIG. 6A–6F, lugs 44 and 46 of coupler 36 are located along a common intersecting line which extends oblique to the common intersecting line of lugs 64 and 66. However, lugs 64 and 66 will automatically and appropriately reposition themselves for being coupled with lugs 44 and 46 to transmit torque between couplers 36 and 38 independent of the relative orientation of lugs 44 and 46 relative to lugs 64 and 66. As shown by FIG. 6A, due to the oblique orientation of lugs 44 and 46 relative to lugs 64 and 66, lug 44 will first engage or abut surface 104 of lug 64 prior to lug 46 engaging surface 104 of lug 66.

Figure 6B:
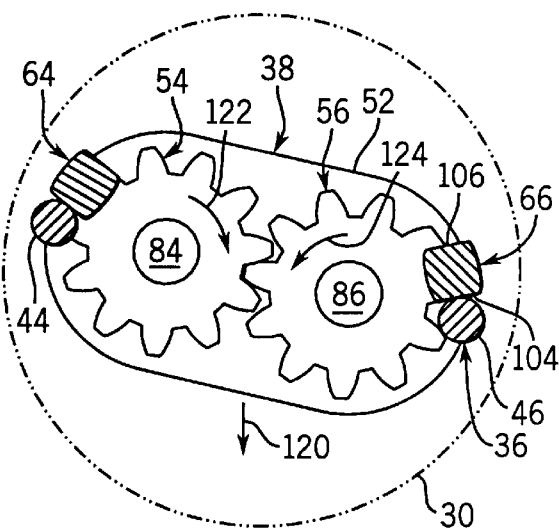
FIG. 6B is a sectional view of the driven coupler and the drive coupler of FIG. 5 illustrating additional relative movement of the driven coupler and the drive coupler such that the lugs of the drive coupler apply torque to the lugs of the driven coupler to rotate members of the driven coupler in opposite rotational directions.

As shown by FIG. 6B, continued movement of coupler 38 relative to coupler 36 in the direction indicated by arrow 120 causes lug 44 to apply torque to lug 64 such that member 54 rotates in a clockwise direction as indicated by arrow 122 about the axis of spindle 84. Rotation of member 54 in the illustrated clockwise direction causes teeth 98 of member 54, which are in engagement with teeth 98 of member 56, to correspondingly apply a torque to member 56 such that member 56 rotates in a counterclockwise direction about the axis of spindle 86, as indicated by arrow 124. At the same time, lug 46 also engages or abuts surface 104 of lug 66 and applies a torque to lug 66 to also rotate member 56 in the illustrated counterclockwise direction. In addition to causing members 54 and 56 to rotate, the application of torque to members 54 and 56 also deforms resilient elements 78 and 80. In the embodiment illustrated, the torque applied to members 54 and 56 compresses resilient elements 78 and 80. Because resilient elements 78 and 80 are coupled to both members 54 and 56 as well as support 52, resilient elements 78 and 80 also transmit a portion of the torque to support 52. As a result, depending upon the amount of torque transmitted to support 52, support 52 also rotates about axis 48 (shown in FIG. 2) to some extent. As both members 54 and 56 rotate in opposite directions, lugs 64 and 66 also rotate towards one another such that the linear distance separating lugs 64 and 66 decreases.

Figure 6C:
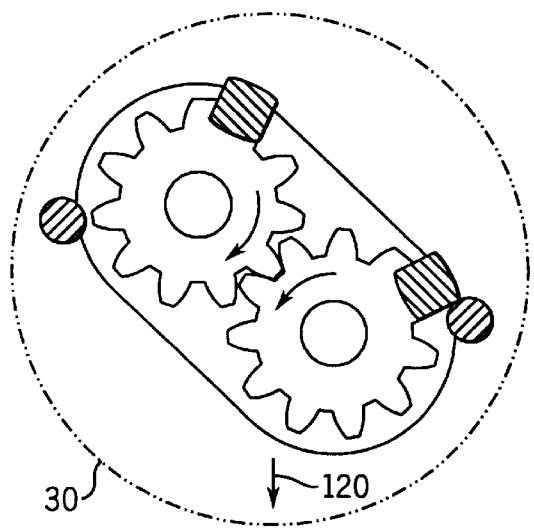
FIG. 6C is a sectional view of the driven coupler and the drive coupler of FIG. 5 illustrating additional relative movement of the driven coupler and the drive coupler such that the lugs of the drive coupler continue to apply torque to the lugs of the driven coupler to further rotate the members of the driven coupler.

As shown by FIG. 6C, members 54 and 56 continue to rotate in opposite directions so long as at least one of lugs 44, 46 are in engagement with at least one of lugs 64, 66. In FIG. 6C, during the continued movement of coupler 38 relative to coupler 36 in the direction indicated by arrow 120, lug 46 continues to apply a torque to lug 66 such that member 56 rotates about the axis of spindle 86 and applies a torque via teeth 98 to member 54 such that member 54 also continues to rotate about the axis of spindle 84 and such that lug 64 axially 20 rotates out of contact with lug 44. Because members 54 and 56 continue rotating in opposite directions, lugs 64 and 66 continue rotating towards one another. As a result, the linear distance separating lugs 64 and 66 also continues to decrease.

Figure 6D:
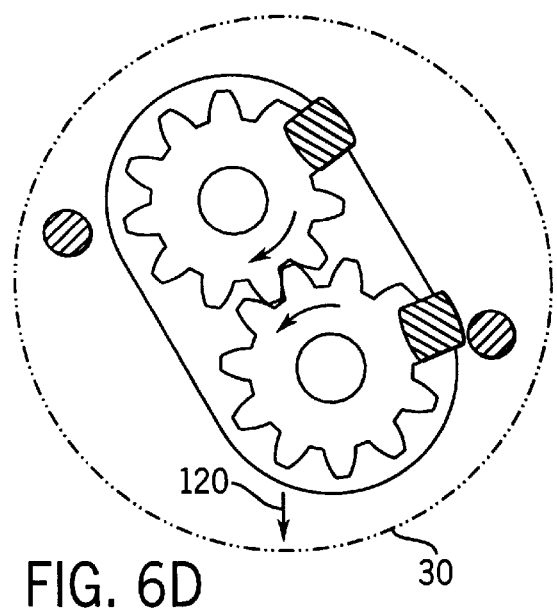
FIG. 6D is a sectional view of the driven coupler and the drive coupler of FIG. 5 illustrating the lugs of the drive coupler applying torque to the lugs of the driven coupler to further rotate the members of the driven coupler such that one of the lugs of the driven coupler is positioned between the lugs of the drive coupler.

As shown by FIG. 6D, continued movement of coupler 38 relative to coupler 36 ultimately causes lugs 44 and 46 to apply torque to lugs 64 and 66 for a sufficient amount of time such that members 54 and 56 also rotate in opposite directions to a sufficient degree to sufficiently reduce the linear distance separating lugs 64 and 66 such that at least one of lugs 64 and 66 can be moved between lugs 44 and 46. For lugs 64 and 66 to both be moved between lugs 44 and 46, the linear distance separating lugs 64 and 66 must, at the very minimum, be less than the linear distance separating lugs 44 and 46. The extent to which members 54 and 56 must rotate to reduce the linear distance separating lugs 64 and 66 depends upon the relative orientation of support 52 and the axes of spindles 84 and 86 relative to lugs 44 and 46. FIG. 6D illustrates members 54 and 56 rotated to a point just prior to lugs 64 and 66 being moveable between lugs 44 and 46.

Figure 6E:
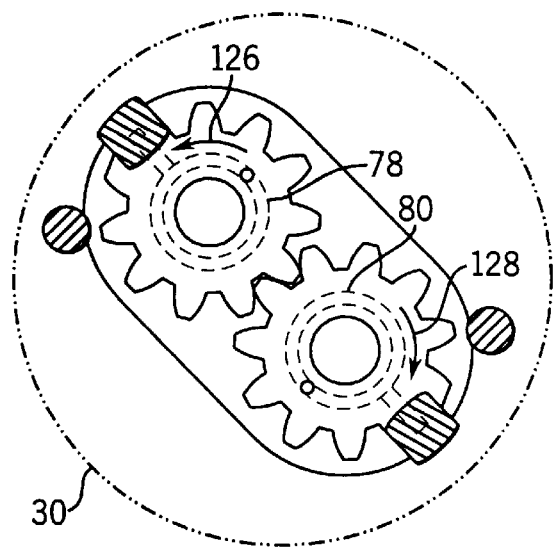
FIG. 6E is a sectional view of the driven coupler and the drive coupler of FIG. 5 illustrating the lugs of the driven coupler being resiliently biased to a torque transmitting position.

As shown by FIG. 6E, continued movement of coupler 38 relative to coupler 36 causes at least one of lugs 44 and 46 to apply torque to at least one of lugs 64, 66 such that members 54, 56 rotate in opposite directions to a sufficient degree such that at least one of lugs 64, 66 is rotated linearly between lugs 44 and 46. In the example illustrated, lug 66 is rotated closer to lug 64 so as to eventually become positioned between lugs 44 and 46 and out of substantial contact with the previously engaging lug 46. Once both lugs 64 and 66 move out of engagement with lugs 44 and 46 and once at least one lug 64, 66 is positioned between lugs 44 and 46, the torque previously applied by lugs 44 and 46 to members 54 and 56 against the biasing force of resilient elements 78 and 80 terminates. As a result, resilient elements 78 and 80 resiliently return to their initial position and at the same time rotate members 54 and 56 so as to return members 54 and 56 as well as lugs 64 and 66 to the original torque transmitting position. In particular, resilient element 78 applies a torque to member 54 to rotate member 54 in a counterclockwise direction as indicated by arrow 126 until member 54 and lug 66 reach the torque transmitting position. Resilient element 80 applies a torque to member 56 to rotate member 56 in a clockwise direction as indicated by arrow 128 until member 56 and lug 66 reach the torque transmitting position. As a result, lugs 64 and 66 automatically position themselves on opposite sides of lugs 44 and 46 such that the imaginary linear line interconnecting lugs 64 and 66 intersects the imaginary line interconnecting lugs 44 and 46. In this orientation, coupler 36 is operably coupled to coupler 38 for the transmission of torque across couplers 36 and 38.

Figure 6F:
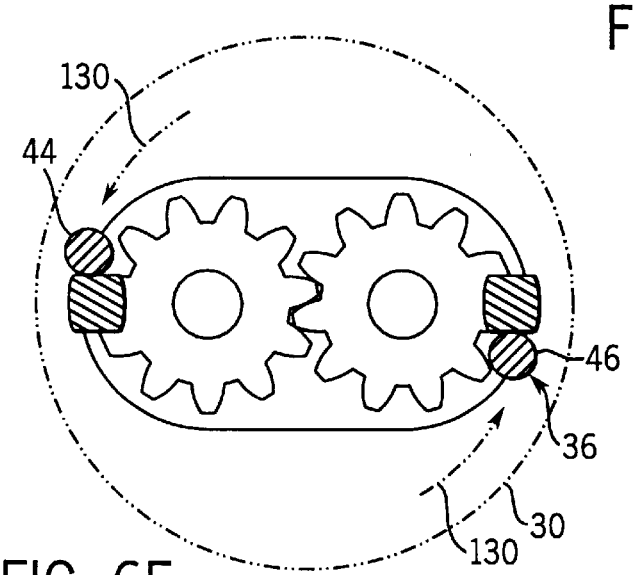
FIG. 6F is a sectional view of the driven coupler and the drive coupler of FIG. 5 illustrating the drive coupler being rotated to transmit torque to and across the driven coupler.

As shown by FIG. 6F, rotation of sprocket 31 by drive train 20 (shown in FIGS. 1 and 2) in a counterclockwise direction as indicated by arrows 130 causes lugs 44 and 46 of coupler 36 to engage and apply torque to surfaces 102 and 104 of lugs 64 and 66, respectively. Because lugs 64 and 66 are located on opposite sides of lugs 44 and 46, the torques applied by lugs 44 and 46 to lugs 64 and 66 are in the same rotational direction. In particular, lug 44 applies torque to lug 64 and member 54 in a counterclockwise direction while lug 46 applies torque to lug 66 and member 56 in a counterclockwise direction. These torques in the same rotational direction would tend to cause members 54 and 56 to also rotate in the same rotational directions. However, because teeth 98 of members 54 and 56 engage one another, teeth 98 prevent rotation of members 54 and 56, causing members 54 and 56 to "lock-up" such that the torques applied by lugs 44 and 46 to members 54 and 56 is further transmitted to support 52. As a result, support 52 rotates to rotatably drive driven shaft 40 and seed plate 35.

The above-described automatic coupling of couplers 36 and 38 illustrates lugs 44 and 46 of coupler 36 supported along a line extending oblique to the line interconnecting lugs 64 and 66 of coupler 38 prior to engagement. As a result, one of lugs 64 and 66 automatically repositions itself to locate its surface 104 adjacent one of lugs 44, 46, while the other of lugs 64 and 66 automatically repositions itself to locate its surface 102 adjacent the other of lugs 44, 46 such that torque is transmitted across couplers 36 and 38 as illustrated in FIG. 6F. However, couplers 36 and 38 automatically engage one another even when lugs 44 and 46 are located along a line extending exactly parallel to a line interconnecting lugs 64 and 66. In such a circumstance, both lugs 64 and 66 will rotate in opposite directions towards one another prior to coupler 38 being positioned substantially coaxial with coupler 36. In this position, both lugs 44 and 46 will extend along either surfaces 102 or surfaces 104 of lugs 64 and 66. However, upon rotation of coupler 36 by drive train 20, one of lugs 44 and 46 will apply additional torque to one of lugs 64 and 66 to cause members 54 and 56 to further rotate in opposite rotational directions until lugs 64 and 66 rotate towards one another a sufficient degree such that one of lugs 64 and 66 passes between lugs 44 and 46 and is resiliently biased to the torque transmitting position whereby lugs 64 and 66 are located on opposite sides of lugs 44 and 46 for the transmission of torque.

In a similar fashion, coupler 38 also automatically disengages or decouples from coupler 36 to enable coupler 38 to be moved relative to coupler 36 in a direction oblique to axis 48. As a result, coupler 38, and the attached seed meter 16 and hopper 14, may be simply lifted relative to coupler 36 and drive train 20 to remove seed meter 16 and hopper 14 from planter 10 for inspection or cleaning. As shown by FIG. 6F, when engaged to one another, lugs 44 and 46 of coupler 36 abut opposite surfaces 102 and 104, respectively, of lugs 64 and 66 to transmit torque. To decouple couplers 38 and 36, coupler 38 is simply lifted relative to coupler 36. As lugs 64 and 66 are lifted relative to lugs 44 and 46, lug 44 will apply a torque to lug 64 against the biasing force of resilient element 78 such that member 54 will rotate in a counterclockwise direction as shown in FIG. 6F. Although member 56 will also rotate in a clockwise direction, because lug 66 is at the same time being lifted away from lug 46, lug 46 will not interfere with the continued rotation of member 56 or member 54. Upon being sufficiently rotated in a counterclockwise direction, lug 64 will pass between lugs 44 and 46 to enable coupler 38 as well as seed meter 16 and hopper 14 to be completely lifted and separated from coupler 36 and drive train 20. Thus, coupler 38 automatically engages coupler 36 for the transmission of torque and automatically disengages coupler 36 for the removal of seed meter 16 and hopper 14 from planter 10 without time consuming and difficult manual assistance.

Figure 7:
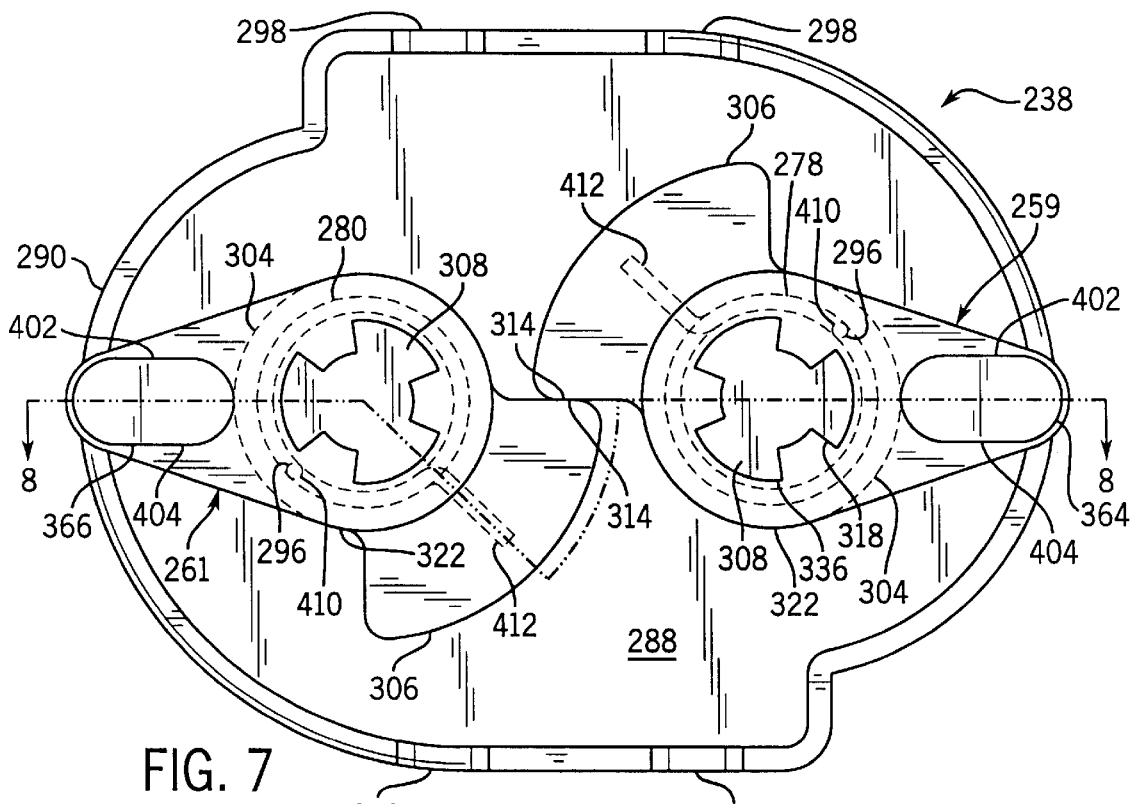
FIG. 7 is a front elevational view of a second embodiment of the driven coupler of FIGS. 2–6 with a portion of the driven coupler removed.
Figure 8:
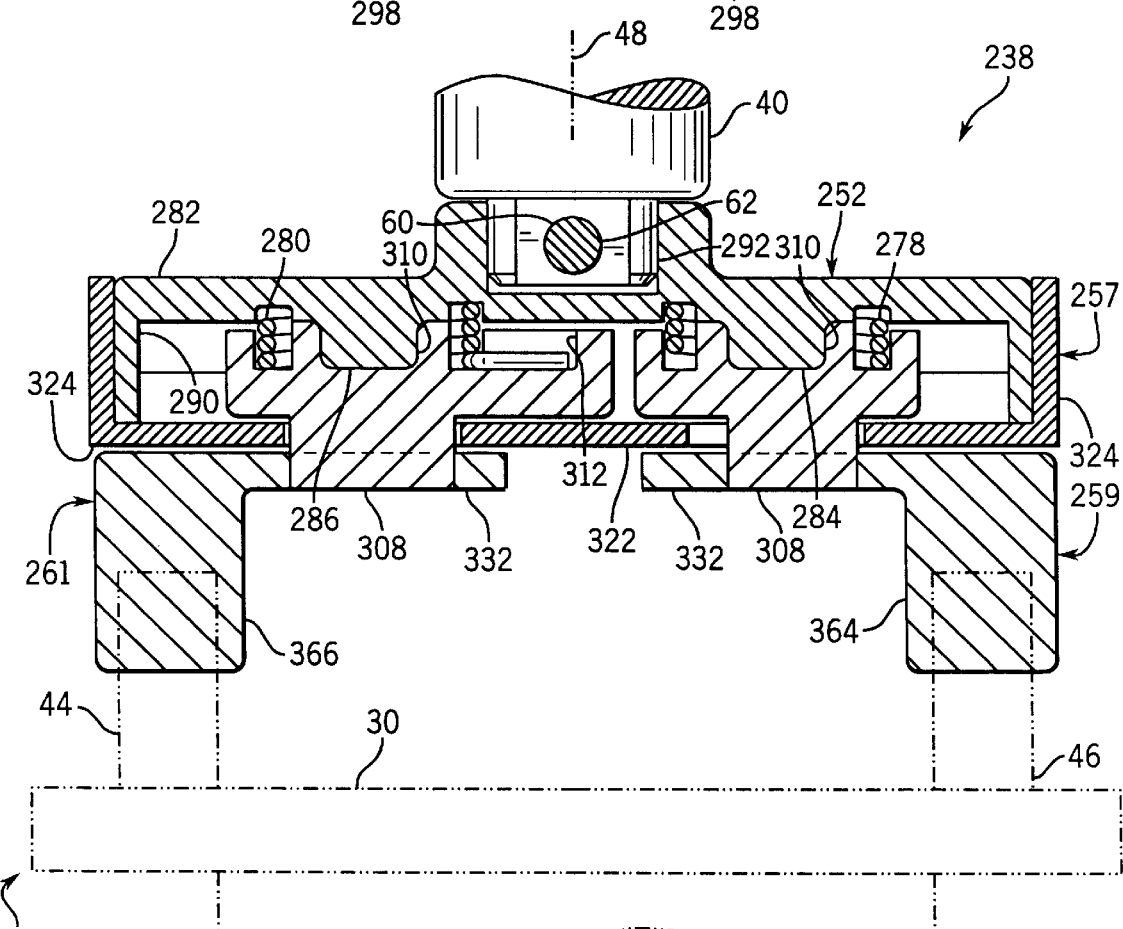
FIG. 8 is a sectional view of the driven coupler of FIG. 7 taken lines 8—8.
Figure 9:
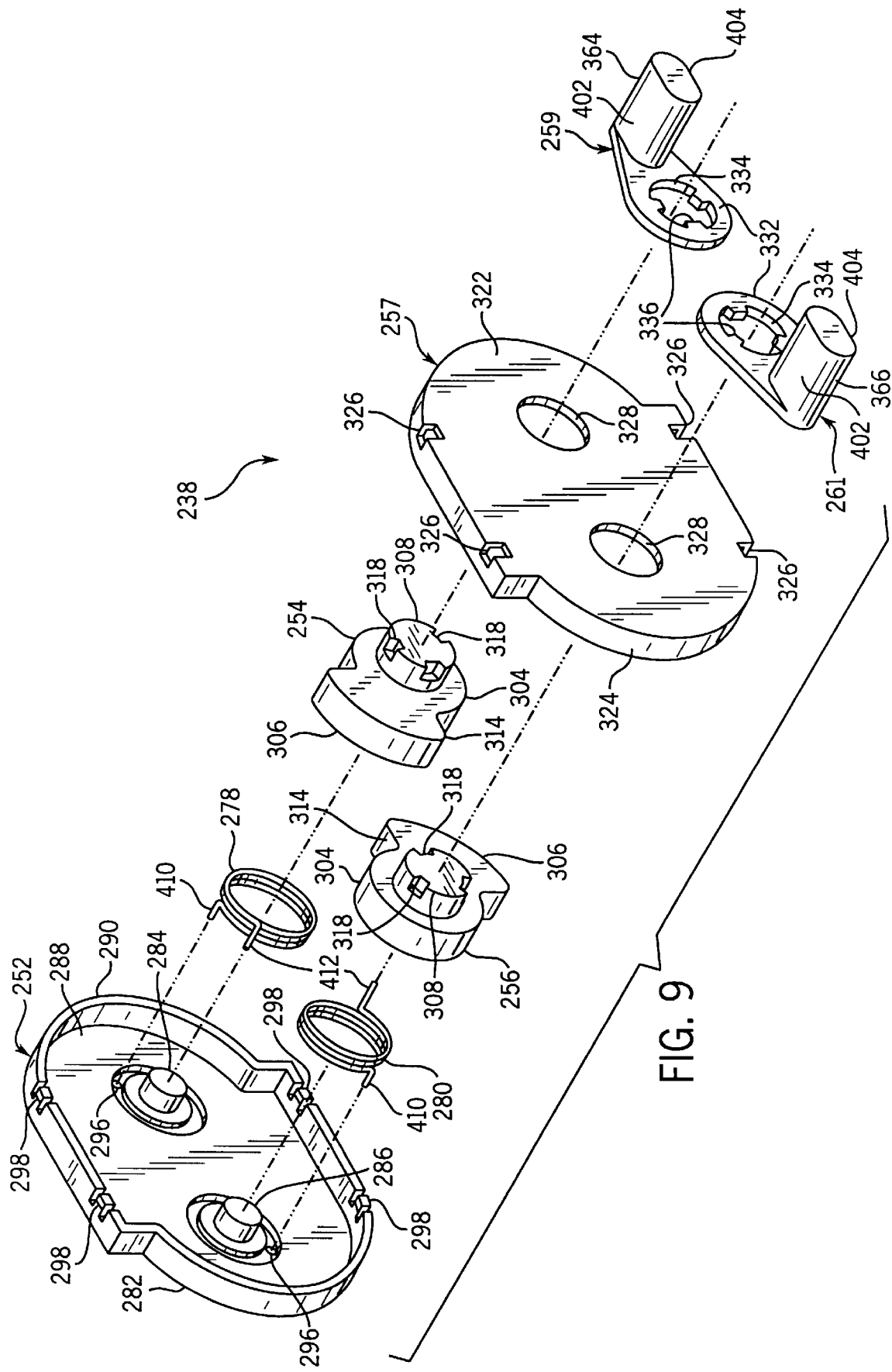
FIG. 9 is an exploded perspective view of the driven coupler of FIG. 7.

FIGS. 7–9 illustrate coupler 238, a second embodiment of coupler 38. Coupler 238 generally includes support 252, members 254, 256, resilient elements 278, 280, cover 257 and lug attachments 259, 261. Support 252 is similar to support 52 except that support 252 additionally provides part of an enclosure for receiving and protecting members 254, 256 and resilient elements 278, 280 from contaminants. Support 252 generally includes base 282, and hubs or spindles 284, 286. Base 282 is configured to be nonrotatably coupled to driven shaft 40 (as shown in FIG. 8), to rotatably support members 254, 256 with resilient elements 278 and 280 therebetween, and to mate with cover 257 to enclose members 254, 256 and elements 278, 280. Base 282 includes back wall 288, side wall 290, shaft receiving bore 292 (shown in FIG. 8), aligned pin receiving bores (not shown) and detents 296. Back wall 288 extends generally perpendicular to axis 48 and supports spindles 284 and 286. Side wall 290 obliquely extends from back wall 288 about a perimeter of back wall 288. Side wall 290 is configured for mating with cover 257. Side wall 290 includes locking tabs 298 which are resiliently flexible so as to resiliently engage cover 257 to secure cover 257 to support 252.

Bore 292 and the pin receiving bores (not shown) are substantially identical to bore 88 and pin receiving bores 58 of base 82, respectively. Bore 292 extends along axis 48 from a back face of back wall 288. Bore 292 is configured for receiving lug 89 of driven shaft 40 such that driven shaft 40 and support 252 are nonrotatably keyed to one another. Bore 292 and lug 89 are preferably semicircular in cross section. To axially secure driven shaft 40 to base 282, base 282 additionally includes a pair of aligned pin-receiving bores which are formed in projections extending from the back face of back wall 288 and which are substantially identical to bores 58 of support 52. The pin-receiving bores receive pin 60 which also extends through bores 62 in lug 89 to secure driven shaft 40 to support 252 and coupler 238.

Detent 296 extend into back wall 288 of base 282 adjacent to spindles 284 and 286. Similar to detents 91 of base 82 (shown in FIGS. 3 and 4), detents 296 capture portions of resilient elements 278 and 280 to couple resilient elements 278 and base 282. Detent 296 are preferably located such that resilient elements 278 and 280 resiliently bias members 254 and 256 as well as lug attachments 259 and 261 to the torque transmitting position illustrated in FIG. 7.

Spindles 284 and 286 are substantially similar to spindles 84 and 86. Spindles 284 and 286 obliquely extend from back wall 288 a sufficient distance to extend into corresponding cavities 310 formed within members 254 and 256, respectively, to rotatably support members 254 and 256. Spindles 284 and 286 support members 254 and 256 at locations such that members 254 and 256 engage one another upon being rotated in the same rotational directions.

Members 254 and 256 are substantially identical to one another. Each of members 254, 256 generally comprises a cam member having a central portion 304, an outwardly projecting lobe 306 and a lug attachment portion 308. Central portion 304 supports and interconnects lobe 306 to lug attachment portion 308. Each central portion 304 is configured for being rotatably coupled to support 252. As best shown by FIG. 8, each central portion 304 includes a central cavity 310 configured for receiving spindles 284, 286 such that members 254, 256 rotate about spindles 284 and 286, respectively. Alternatively, central portion 304 may include a projecting shaft or spindle which is rotatably received within a corresponding bore formed within support 252. Although illustrated as being circular in shape, central portion 304 may have any of a variety of different shapes and configurations so as to be rotatably coupled to support 252 and so as to support lobes 306 for engagement with the adjacent lobe 306 of the other member when members 254 and 256 are rotated in the same rotational direction.

Lobes 306 project radially outward from central portion 304 and include a cam surface 314. Cam surfaces 314 of members 254 and 256 are located and configured to engage one another upon the rotation of members 254 and 256 in the same direction (i.e. when torque is exerted upon members 254 and 256 in the same direction). As shown by FIG. 7, cam surfaces 314 are configured to engage one another so as to oppose the unrestricted rotation of members 254 and 256 in the same direction when coupler 238 is in the torque transmitting position. As shown by FIG. 8, central portion 304 and lobe 306 include an additional detent or cavity 312 configured to receive and retain an end of one of resilient elements 278, 280 such that members 254 and 256 are resiliently biased into the torque transmitting position as shown in FIG. 7.

Lug attachment portions 308 comprise circular shafts which project from central portions 304 concentrically about the rotational axis of spindles 284 and 286. Lug attachment portions 308 of members 254 and 256 project from central portions 304 a sufficient distance so as to extend through cover 257 for attachment to lug attachments 259 and 261, respectively. Each lug attachment portion 308 is configured for being nonrotatably coupled to lug attachments 259, 261. Preferably, lug attachment portions 308 of members 254 and 256 each include grooves or key ways 318 located and configured for being keyed to lug attachments 259 and 261, respectively. Alternatively, other methods may be used to nonrotatably couple lug attachment portions 308 of members 254 and 256 to lug attachments 259 and 261, respectively.

Cover 257 is configured for mating with support 252 so as to enclose members 254, 256 and resilient elements 278, 280 therebetween while also permitting lug attachments 259 and 261 to be attached to members 254 and 256, respectively. Cover 257 includes front wall 322, side wall 324, slots 326 and apertures 328. Front wall 322 extends opposite rear wall 288 of base 282. Side walls 324 obliquely extend from front wall 322 about a perimeter of front wall 322. As best shown by FIG. 8, side walls 324 of cover 257 abut and overlap side walls 290 of base 282 to substantially enclose members 254, 256 and elements 278, 280. Slots 326 are located and sized to receive tabs 298 of base 282. Slots 326 enable cover 257 to be removably attached to base 282 of support 252. Alternatively, other methods or latching mechanisms may be used to secure cover 257 to base 282.

Apertures 328 extend through front wall 322 at locations corresponding to spindles 284, 286 and attachment portions 308 of members 254 and 256 to enable lug attachment portions 308 to be attached to lug attachments 259 and 261 and to enable rotation of members 254 and 256 as well as lug attachments 259 and 261 with one another in opposite rotational directions.

Lug attachments 259 and 261 are substantially identical to one another and include mounting portions 332 and lugs 364, 366. Mounting portions 332 are configured for being nonrotatably coupled to members 254 and 256 so as to rotate with members 254 and 256. In the exemplary embodiment illustrated, mounting portions 332 each include a central bore 334 having inwardly projecting tabs or keys 336 which are located and configured so as to project into corresponding key ways 318 of portions 308 when portions 308 are positioned within bores 334. As a result, keys 336 nonrotatably couple attachments 259 and 261 to members 254 and 256, respectively. Alternatively, mounting portions 332 of attachments 259 and 261 may include projecting shaft portions which project through apertures 328 of cover 257 to nonrotatably engage members 254 and 256, respectively. Mounting portions 332 support lugs 364 and 366.

Lugs 364 and 366 obliquely project from mounting portions 332 and are substantially similar to lugs 64 and 66 of coupler 38. Lugs 364 and 366 each include two opposing surfaces 402, 404 which generally extend parallel to one another and which are located eccentric to the axis of rotation of attachments 259, 261 and members 254 and 256. As with lugs 64 and 66, lugs 364 and 366 project away from mounting portion 332 a sufficient distance such that either of surfaces 402 or 404 engage and abut either of lugs 44 or 46 of coupler 36 (shown in FIG. 8). Lugs 364 and 366 are preferably located so as to align with lugs 44 and 46 when members 354 and 356 are rotated such that lugs 364 and 366 are positioned 180 degrees apart from one another about axis 48.

Resilient elements 278 and 280 are resiliently flexible or resiliently deformable members which are coupled between support 252 and members 354 and 356, respectively. Resilient elements 278 and 280 are substantially identical to resilient elements 78 and 80 of coupler 38. Resilient elements 278 and 280 resiliently bias members 254 and 256, respectively, such that interconnected lugs 364 and 366 are biased into the torque transmitting position illustrated in FIG. 7 whereby lugs 364 and 366 are linearly spaced from one another by a distance substantially equal to the linear distance separating lugs 44 and 46 of coupler 36. With respect to the linear distance separating lugs 364 and 366 as well as the linear distance separating lugs 44 and 46, the term "substantially equal" means that the linear distance separating lugs 364 and 366 is sufficiently similar to the linear distance separating lugs 44 and 46 such that at least a portion of either of surfaces 402 or 404 abut against and engage at least a portion of either lugs 44 and 46 by a sufficient amount to transmit torque. In the exemplary embodiment illustrated, resilient elements 278 and 280 comprise conventionally known torsion springs 20 having a first end portion 410 configured for projecting into a corresponding detent 296 within support 252 and a second end portion 412 configured for being received within a corresponding cavity 312 of either members 254 or 256. Although resilient elements 278 and 280 are illustrated as torsional springs, a multitude of alternative elements may be used to resiliently bias members 354 and 356 as well as lugs 364 and 366 into the torque transmitting position. For example, coupler 238 may alternatively include rubber bushings positioned about spindles 284 and 286 within cavities 310, wherein the bushings resiliently twist and deform in response to forces rotating members 254 and 256 out of the torque transmitting position. Other elements such as single compression springs may also be used.

Although easier to manufacture as compared to coupler 38, coupler 238 functions substantially similar to coupler 38. In particular, cam surfaces 314 engage one another to prevent unrestricted rotation of members 254 and 256 in the same direction. However, members 254 and 256 are rotatable in opposite directions when interconnected lugs 364 and 366 are in engagement with at least one of lugs 44 and 46 of coupler 36 to move at least one of lugs 364 and 366 from a first torque transmitting position in which lugs 364 and 366 are spaced from one another by a linear distance substantially equal to the linear distance between lugs 44 and 46 to a second position in which lugs 364 and 366 are spaced from one another by a linear distance unequal to the first linear distance. In contrast to members 54 and 56 of coupler 38, members 254 and 256 of coupler 238 are not in constant engagement with one another. Members 254 and 256 engage one another only when members 254 and 256 have been resiliently biased to the torque transmitting position shown in FIG. 7. Torque exerted upon one of lugs 364, 366 of one of members 254, 256 will not automatically be transmitted to the other of lugs 364, 366 and members 254, 256.

Although members 254 and 256 are rotatable in opposite directions when at least one of lugs 364 and 366 are in engagement with at least one of lugs 44 and 46, only one of members 254 and 256 needs to rotate to reduce the linear distance between lugs 364 and 366.

Thus, couplers 36 and 238 automatically engage one another and automatically disengage one another upon movement of couplers 36 and 238 relative to one another in a direction oblique to axis 48. Upon being vertically lowered relative to coupler 36, lugs 364 and 366 engage lugs 44 and 46 and are thereby repositioned with respect to lugs 44 and 46 to engage lugs 44 and 46 on opposite sides of axis 48 for transmitting torque from drive train 20 to driven shaft 40. Conversely, upon being lifted relative to coupler 36, lugs 364 and 366 automatically reposition themselves with respect to lugs 44 and 46 so as to automatically disengage lugs 44 and 46 to enable coupler 238 and any associated component, such as seed meter 16 and hopper 14 (shown in FIG. 1) to be separated from coupler 36 and its associated components including drive train 20 and frame 12. As a result, torque may be exerted upon one of lugs 364, 366 to cause its corresponding member 254, 256 to rotate while the other lug and its corresponding member remain stationary relative to support 252 in the torque transmitting position until torque is also exerted upon the other lug and its member. Because rotation of one of members 254, 256 does not automatically require corresponding rotation of the other of members 254, 256 against the biasing force of elements 278 and 280, the force necessary to rotate one of lugs 364, 366 is reduced.

The components of couplers 38 and 238 may be formed from a variety of conventional materials which are appropriate for the described functions of each of the components. In the exemplary embodiment illustrated, supports 52, 252, members 54, 56, 254, 256, lug attachments 259, 261 and cover 257 are preferably formed from an electrically conductive plastic, such as STAT-KON® TC-1004 sold by LNP Engineering Plastics, Inc., located at 475 Creamery Way, Exton, Penn. 19341. Because supports 52, 252, members 54, 56, 254, 256 and lug attachments 259, 261 are formed from an electrically conductive material, coupler 38, 238 additionally discharge static build-up from seed meter 16 which is generally produced by the rotation of a seed disc relative to a seed cover. Alternatively, supports 52, 252, members 54, 56, 254, 256, lug attachments 259, 261 and cover 257 may be formed from a variety of alternative plastics, such as reinforced thermoplastic materials or metals.

FIGS. 10 and 11 illustrate coupler 538, a third embodiment of coupler 38. Coupler 538 functions substantially identical to coupler 38 except that coupler 538 additionally includes lockout mechanism 540 for enabling coupler 538 to be locked into a non-torque transmitting position (illustrated in FIG. 11). Coupler 538 is similar to coupler 38 except that coupler 538 alternatively includes support 552 and members 554, 556. As with support 52, support 552 is configured for being coupled to driven shaft 40 on one side and rotatably support members 554 and 556 on a second opposite side. Support 552 rotatably supports members 654 and 656 about spindles 84 and 86, respectfully. Support 552 also includes an outwardly projecting platform portion 557 which slidably supports lock-out mechanism 540.

Members 554 and 556 are similar to members 54 and 56 except that members 554 and 556 include round lugs 564 and 566, respectively, and detents 568. Lugs 554 and 556 axially project from members 554 and 556 for engagement with lugs 44 and 46 when members 554 and 556 are resiliently biased into a torque transmitting position (shown in FIG. 10) by resilient elements 78 and 80, respectively (shown in FIGS. 1–5). Detents 568 extend into members 554 and 556 and are sized for receiving lock-out mechanism 540.

Lock-out mechanism 540 generally includes key lock 570 and locking nibs 582. Key lock 570 slidably mounts within a groove 588 formed within portion 557 of support 552. Key lock 557 slides along portion 557 from a first disengaged position shown in FIG. 10 to a second engaged position shown in FIG. 11. In the disengaged position shown in FIG. 10, key lock 570 is out of engagement with members 554 and 556 such that members 554 and 556 may rotate relative to support 552 to automatically engage lugs 44 and 46 of coupler 36. In the engaged position shown in FIG. 11, key lock 570 projects into detent 568 to maintain members 554 and 556 relative to one another such that lugs 564 and 566 are spaced from one another by a distance less than the distance separating lugs 44 and 46.

Locking nibs 582 project from the surface of portion 557 of support 552 and resiliently engage key lock 570 to temporarily retain key lock 570 in either the disengaged position shown in FIG. 10 or the engaged position shown in FIG. 11. Locking nibs 582 are preferably formed from a resiliently flexible reinforced nylon.

Locking mechanism 570 enables lugs 554 and 556 of coupler 538 to be locked out of engagement with lugs 44 and 46 of coupler 36. As a result, rotation of coupler 36 by drive train 20 (shown in FIG. 1) does not transmit torque to coupler 538 or seed meter 16. This feature enables planter 10 to be adjusted so that individual planting units may be temporarily disengaged such as when seeds are to be planted in every other row.

FIGS. 12–15 illustrate coupler 638, a fourth embodiment of coupler 38. As with coupler 538 (illustrated in FIGS. 10 and 11), coupler 638 functions substantially identical to coupler 38 except that coupler 638 may be additionally locked out of engagement with coupler 36 to disengage seed meter 16 (shown in FIG. 1). Coupler 638 is similar to coupler 38 except that coupler 638 alternatively includes support 652, members 654, 656 and lock-out mechanism 640. As with support 52, support 652 is configured to be coupled to driven shaft 40 (shown in FIG. 5). Support 652 rotatably supports members 654 and 656 about spindles 84 and 86, respectively, and includes a platform portion 657 which supports lock-out mechanism 640.

Figure 12:
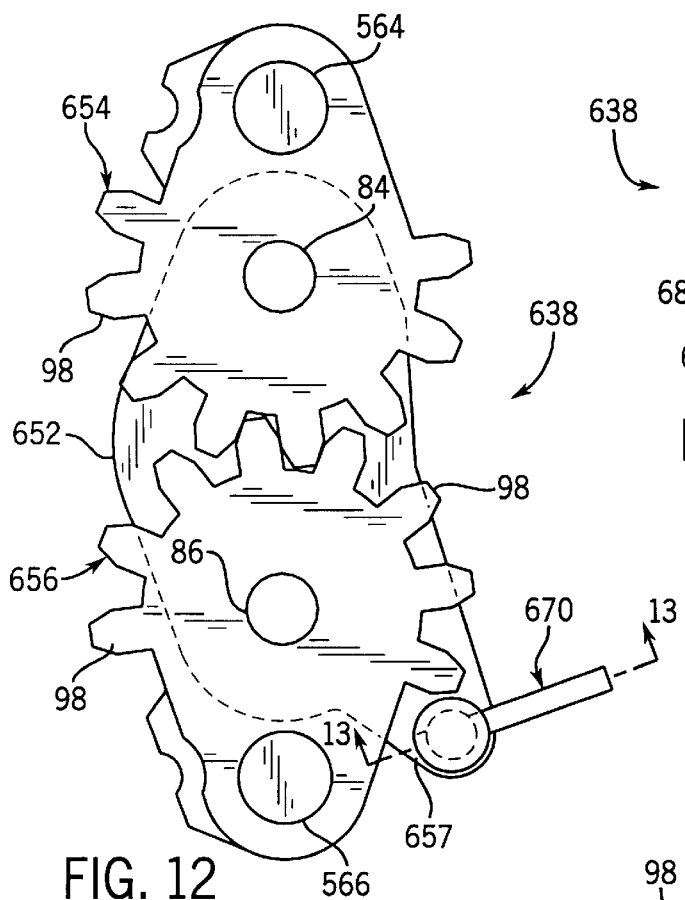
FIG. 12 is a top elevational view of a fourth embodiment of the driven coupler having members in a torque transmitting position.

Members 654 and 656 are similar to members 54 and 56. Members 654 and 656 are rotatably supported about spindles 84 and 86 and are resiliently biased by resilient elements 78 and 80 (shown in FIGS. 2–5), respectively, such that lugs 564 and 566 are positioned in a torque transmitting position as shown in FIG. 12.

Figure 13:
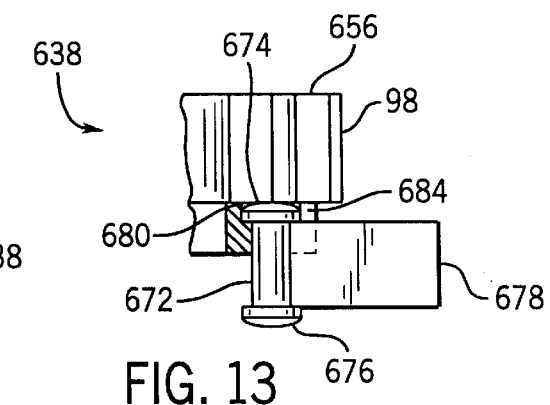
FIG. 13 is an enlarged fragmentary sectional view of the driven coupler of FIG. 12 taken along lines 13—13.
Figure 14:
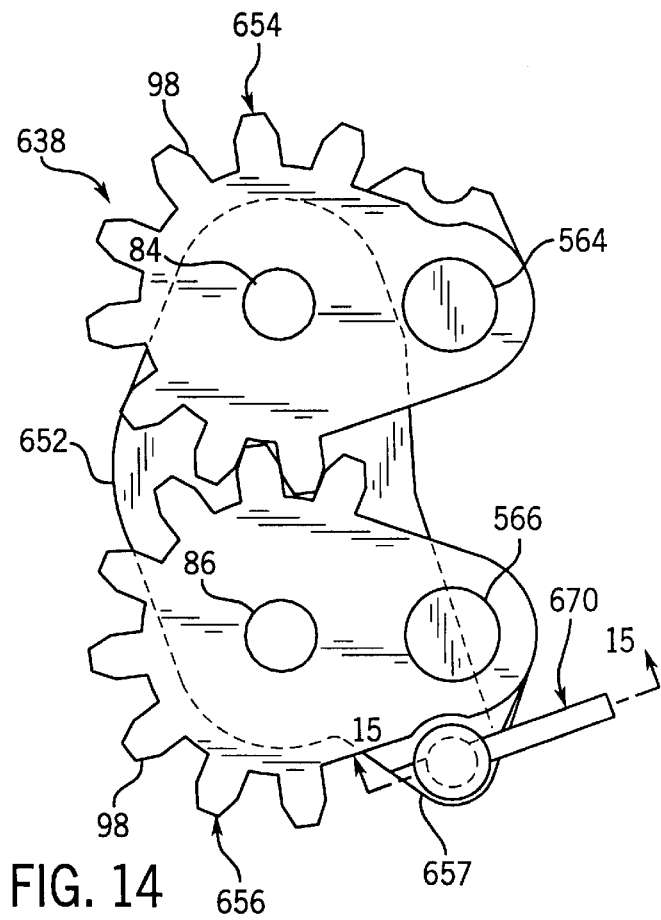
FIG. 14 is a top elevational view of the driven coupler of FIG. 12 having members locked in a non-torque transmitting position.

As best shown by FIGS. 13 and 14, lock-out mechanism 640 includes a shaft 672, upper and lower caps 674 and 676, and tab 678. Shaft 672 is slidably received within bore 682 extending through portion 657 of support 652. Bore 682 includes a lateral opening 684 to permit tab 678 to be moved therethrough. Tab 678 is coupled to shaft 672 and enables lock-out mechanism 640 to be easily grasped.

Figure 15:
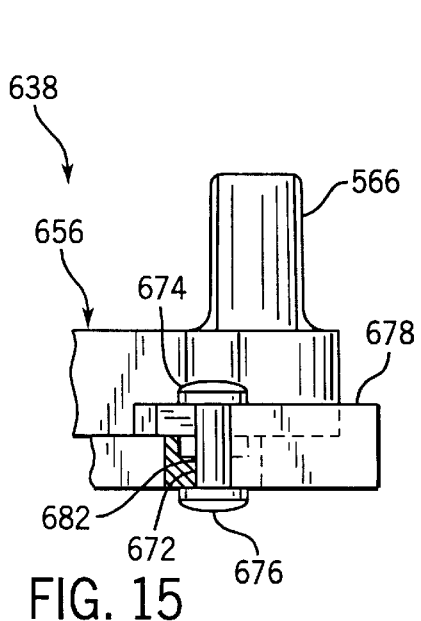
FIG. 15 is an enlarged fragmentary sectional view of the driven coupler of FIG. 14 taken along lines 15—15.

Lock-out mechanism 640 moves between a disengaged position (shown in FIGS. 12 and 13) and an engaged position (shown in FIGS. 14 and 15). In the disengaged position, lock-out mechanism 676 rests within the depression 680 formed in support 652 below member 656. As a result, lock-out mechanism 640 does not engage member 656 such that lugs 564 and 566, as well as members 654 and 656, may freely rotate relative to one another in opposite rotational directions to enable coupler 638 to automatically engage with coupler 36. In the engaged position shown in FIGS. 14 and 15, lock-out mechanism 640 is upwardly actuated so as to project from support 652 into engagement with member 656. In the engaged position, lock-out mechanism 640 maintains members 654 and 656 in a non-torque transmitting position such that lugs 554 and 556 are spaced from one another by a distance less than the distance separating lugs 44 and 46 of coupler 36 (shown in FIG. 2).

Although lock-out mechanisms 570 and 670 are illustrated as being supported by supports 552 and 652, respectively, other lock-out mechanisms extending between members 564 and 566 or members 654 and 656 may alternatively be utilized to maintain coupler 538 or 638 in a non-torque transmitting position with respect to coupler 36. For example, at least one of members 654 and 656 could alternatively be provided with a hook member or other means adapted to releasibly engage the other of members 654 and 656 to secure lugs 564 and 566 in the non-torque transmitting position shown in FIG. 14.

Although presently viewed as optimum designs, couplers 38, 238, 538 and 638 illustrate but four of a multitude of possible different contemplated designs or arrangements for use with a torque coupler having first and second lugs spaced apart by a first distance wherein the arrangement includes a support, a first member rotatably coupled to the support and including a third lug and a second member rotatably coupled to the support and including a fourth lug, wherein the first and second members engage one another to prevent unrestricted rotation of the first and second members in the same direction, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance. For example, although lugs 64, 66, 364 and 366 are illustrated as extending towards and parallel to lugs 44 and 46 of coupler 36, lugs 64, 66, 364 and 366 may alternatively extend towards lugs 44 and 46 for engagement with lugs 44 and 46 at various other relative angles. In one contemplated embodiment, the lugs of each of couplers 36 and 38, 238 extend towards one another at an angle of approximately 45 degrees angle with respect to sprocket 31 and support 52, 252, respectively, and at a 90 degrees angle with respect to one another.

Although lugs 64, 66, 364, 366 as well as lugs 44 and 46 are illustrated as extending along center lines parallel to axis 48, lugs 64, 66, 364, 366 as well as lugs 44 and 46 may alternatively extend along center lines perpendicular or oblique to axis 48. For example, lugs 44, 46 may comprise lugs radially extending relative to axis 48 while lugs 64, 66, 364, 366 comprise L-shaped members having portions radially extending outwardly or inwardly relative to axis 48 for engagement with lugs 44 and 46. Moreover, one set of lugs 44, 46 may be configured to extend along a center line parallel to axis 48 while the other set of lugs 64, 66, 364, 366 could be configured to extend in a radial direction inwardly or outwardly with respect to axis 48. The plane in which lugs 44 and 46 and lugs 64, 66, 364, 366 engage one another may comprise the same plane in which members 54 and 56 rotate, the plane in which the member supporting lugs 44 and 46 rotates or a plane therebetween.

Furthermore, in lieu of comprising elongate protuberances projecting parallel to axis 48, lugs 64 and 66 may alternatively each comprise one a plurality of teeth radially projecting outward from the rotational axes of members 54 and 56 wherein coupler 36 includes a pair of lugs 44, 46 which extend between adjacent teeth or lugs of each member 54, 56. For example, lugs 64 and 66 of coupler 38 may alternatively be omitted while lugs 44 and 46 may be extended so as to extend between adjacent gear teeth 98 when couplers 36 and 38 are in substantial coaxial alignment with one another. In such an alternative embodiment, gear teeth 98 would serve as lugs. During the rotation of coupler 36, lugs 44 and 46 would apply torque to the engaged gear teeth 98 in the same rotational direction so as to transmit torque to members 54 and 56 across support 52 to driven shaft 40. However, movement of lugs 44, 46 relative to gear teeth 98 in a direction oblique to axis 48 would cause members 54 and 56 to rotate in opposite directions to enable lugs 44 and 46 to be positioned between adjacent gear teeth 98 during the coupling of couplers 36 and 38 or to be removed from between adjacent gear teeth 98 during the uncoupling of couplers 36 and 38. Although, lugs 64, 66 or lugs 364, 366 are illustrated as moving closer to one another upon the rotation of members 54, 56 or members 254, 256 until at least one lug moves between lugs 44 and 46 during automatic engagement or disengagement of couplers 36 and 38, 238, lugs 44 and 46 as well as lugs 64, 66 or lugs 364, 366 may alternatively be configured such that lugs 64, 66 or 364, 366 alternatively move away from one another upon the rotation of members 54, 56 or 254, 256 until at least one of lugs 44, 46 moves between lugs 64, 66 or 364, 366 during automatic engagement and disengagement of couplers 36 and 38, 238.

Although lugs 64, 66 as well as lugs 364 and 366 are illustrated as being located approximately 180 degrees apart from one another on opposite sides of axis 48 when in the torque-transmitting position, this is largely due to the fact that lugs 44 and 46 of coupler 36 are also positioned 180 degrees apart from one another on opposite sides of axis 48. This arrangement is viewed as optimal. However, alternative arrangements may be provided for in which lugs 44 and 46 of coupler 36 are spaced apart from one another by an angle other than 180 degrees such that lugs 64, 66 or lugs 364, 366 are correspondingly spaced apart from one another by an angle other than 180 degrees in the torque-transmitting position.

Although members 54, 56 as well as members 254 and 256 of couplers 38 and 238, respectively, each include surfaces that engage one another to inhibit unrestricted rotation of the members in the same direction, other member engagement means may alternatively be used to engage members 54, 56 or members 254, 256 to prevent unrestricted rotation of the members in the same rotational direction. Examples of such alternative member engagement means include mechanisms which lock one or both of members 54, 56 or members 254, 256 to support 52, 252 in response to the application of torque to members 54, 56 or 254, 256 in the same rotational direction. Such mechanisms include rachet-type arrangements or interlocking pin-detent arrangements. Furthermore, although the surfaces of members 54, 56 or members 254, 256 automatically engage one another to prevent unrestricted rotation of the members in the same rotational direction, coupler 38, 238 may alternatively be configured for manual or powered actuation from a first state in which the rotation of members 54, 56 or members 254, 256 in the same rotational direction is unrestricted to a second state in which the rotation of members 54, 56 or members 254, 256 in the same rotational direction is restricted.

Furthermore, although coupler 38 is illustrated as being coupled to driven shaft 40 while coupler 36 is illustrated as being coupled to drive train 20, coupler 38 as well as coupler 238 may alternatively be directly coupled to drive train 20 while coupler 36 is directly coupled to driven shaft 40. Although coupler 38 is illustrated in conjunction with planter 10, coupler 38 may alternatively be employed in a multitude of alternative vehicles, machines and implements where it would be advantageous to include a disengageable drive system that enables the driven shaft to be disengaged and separated from the drive shaft or to be engaged and coupled to the drive shaft for torque transmission by simple relative movement of one coupler relative to the other in a direction oblique to the axis or axes of rotation of the drive shaft and driven shaft.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A planter comprising:
   a frame;
   a rotatable drive shaft coupled to the frame;
   a seed meter releasably coupled to the frame, the seed meter including a rotatable seed metering surface;
   a driven shaft coupled to the seed metering surface;
   a first torque coupler coupled to one of the drive shaft and the driven shaft, the first torque coupler including first and second lugs spaced apart by a first distance; and
   a second torque coupler coupled to the other of the drive shaft and the driven shaft, the second torque coupler including:
      a support;
      a first member rotatably coupled to the support and including a third lug; and
      a second member rotatably coupled to the support and including a fourth lug, wherein the first and second members engage one another to prevent unrestricted rotation of the first and second members in the same direction, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

2. The planter of claim 1 wherein the first torque coupler is driven by the second torque coupler.

3. The planter of claim 1, wherein the first member comprises a first gear having gear teeth and wherein the second member comprises a second gear having gear teeth engaging the gear teeth of the first member.

4. The planter of claim 1, wherein the first member includes a first cam surface and wherein the second member includes a second cam surface configured to engage the first cam surface.

5. The planter of claim 4, including a housing enclosing the first and second cam surfaces.

6. The planter of claim 1, including a first resilient element between the support and the second member.

7. The planter of claim 6, including a second resilient element between the support and the second member.

8. The planter of claim 1, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance less than the first distance.

9. The planter of claim 1, wherein the first and second members rotate about first and second axes and wherein the first and second lugs extend substantially parallel to the first and second axes, respectively.

10. The planter of claim 1, wherein the support is configured for rotation about a first axis and wherein the third and fourth lugs are spaced from one another approximately 180 degrees about the axis when the third and fourth lugs are in the first torque transmitting position.

11. An agricultural material metering system for use with an agricultural implement having a drive train and a first torque coupler operably coupled to the drive train, wherein the first torque coupler has first and second lugs spaced apart by a first distance, the agricultural material metering system comprising;
   an agricultural material metering device configured to meter out agricultural material upon rotatably driven; and
   a second torque coupler operably coupled to the agricultural material metering device to rotatably drive the agricultural material metering device and adapted to be disengagably coupled to the first torque coupler of the agricultural implement, the second torque coupler including;
   a support;
   a first member rotatably coupled to the support and including a third lug;
   a second member rotatably coupled to the support and including a fourth lug, and
   member engagement means coupled to the first and second members to prevent unrestricted rotation of the first and second members in the same direction, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a position in which the third and fourth lugs are spaced from one another by a third distance unequal to the first distance.

12. The agricultural material metering system of claim 11, wherein the member engagement means includes a first surface projecting from the first member and a second surface projecting from the second member, the first and second surfaces engaging one another to prevent unrestricted rotation of the first and second members in the same direction.

13. The agricultural material metering system of claim 11 including a hopper coupled to the agricultural material metering device, wherein the hopper provides a supply of agricultural material to the metering device.

14. The agricultural material metering system of claim 11 wherein the agricultural material metering device is configured to meter out seed.

15. An agricultural implement comprising:
   a frame;
   a rotatable drive shaft coupled to the frame;
   an agricultural material metering device releasably coupled to the frame, the agricultural material metering device being configured to meter out agricultural material upon being rotatably driven;
   a driven shaft coupled to the metering device to rotatably drive the metering device;
   a first torque coupler coupled to one of the drive shaft and the driven shaft, the first torque coupler including first and second lugs spaced apart by first distance; and
   a second torque coupler coupled to the other of the drive shaft and the driven shaft, the second torque coupler including:
   a support;
   a first member rotatably coupled to the support and including a third lug; and
   a second member rotatably coupled to the support and including a fourth lug, wherein the first and second members engage one another to prevent unrestricted rotation of the first and second members in the same direction, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

16. The agricultural implement of claim 15, wherein the agricultural material metering device is configured to meter out seed.

17. The implement of claim 15, including a hopper supported by the frame and configured to contain and supply agricultural material to the agricultural material metering device.

18. An agricultural implement comprising;
   a frame;
   a rotatable drive shaft coupled to the frame;
   an agricultural material metering device releasably coupled to the frame, the agricultural material metering device being configured to meter out agricultural material upon being rotatably driven;
   a driven shaft coupled to the metering device to rotatable drive the metering device;
   a first torque coupler coupled to one of the drive shaft and the driven shaft, the first torque coupler including first and second lugs; and
   a second torque coupler rotatable about an axis of rotation and including:
   a support;
   a first member rotatably coupled to the support and including a third lug adapted to engage the first lug;
   a second member rotatably coupled to the support in engagement with the first member so as to prevent rotation of the first and second members in the same rotational direction, the second member including a fourth lug adapted to engage the second lug; and
   a first resilient element coupled between the support and the first member, the first resilient element biasing the third lug into a first torque transmitting position in which the third lug is positioned for engagement with the first lug.

19. The implement of claim 18, wherein the second torque coupler is driven by the first torque coupler.

20. The implement of claim 18, wherein the first member comprises a first gear having gear teeth and wherein the second member comprises a second gear having gear teeth engaging the gear teeth of the first member.

21. The implement of claim 18, wherein the first member includes a first cam surface and wherein the second member includes a second cam surface configured to engage the first cam surface.

22. The implement of claim 21, including a housing enclosing the first and second cam surfaces.

23. The implement of claim 18, including a second resilient element coupled between the support and the second member, the second resilient element biasing the third lug into a second torque transmitting position in which the fourth is positioned for engagement with the second lug.

24. The implement of claim 18, wherein the first and second lugs are spaced apart by a first distance and the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance unequal to the first distance.

25. The implement of claim 18, wherein the first and second members are rotatable in opposite directions when in engagement with at least one of the first and second lugs to move at least one of the third and fourth lugs from a first torque transmitting position in which the third and fourth lugs are spaced from one another by a second distance substantially equal to the first distance to a second position in which the third and fourth lugs are spaced from one another by a third distance less than the first distance.

26. The implement of claim 18, wherein the first and second members rotate about first and second axes and wherein the first and second lugs extend substantially parallel to the first and second axes, respectively.

27. An agricultural material metering system for use with an agricultural implement having a drive train and a first torque coupler operably coupled to the drive train, wherein the first torque coupler has first and second lugs spaced apart by a first distance, the agricultural material metering system comprising:

an agricultural material metering device configured to meter out agricultural material upon being rotatably driven; and a second torque coupler operably coupled to the agricultural material metering device so as to rotatably drive the agricultural material metering device, the second torque coupler including:

a support;

a first member rotatably coupled to the support and including a third lug; and a second member rotatably coupled to the support and including a fourth lug, wherein the first and second members engage one another to prevent rotation of the first and second members in the same direction, wherein the first and second members are rotatable in opposite directions when in engagement with at least one of the first and second lugs to move the third and fourth lugs closer together such that the first axis of the first torque coupler may be moved into substantial coaxial alignment with the second axis of the second torque coupler while the lugs of the first and second torque couplers engage one another.

\* \* \* \* \*